US012285834B2

(12) United States Patent
Koike

(10) Patent No.: US 12,285,834 B2
(45) Date of Patent: Apr. 29, 2025

(54) PROCESSING SYSTEM, DISPLAY SYSTEM, PROCESSING APPARATUS, PROCESSING METHOD, AND RECORD MEDIUM THAT DETERMINES PROCESS PERIOD AND SAMPLING FREQUENCY FOR AD CONVERTER FOR CUTTING TOOL

(71) Applicant: Sumitomo Electric Industries, Ltd., Osaka (JP)

(72) Inventor: Yusuke Koike, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 45 days.

(21) Appl. No.: 18/265,262

(22) PCT Filed: Dec. 10, 2020

(86) PCT No.: PCT/JP2020/046069
§ 371 (c)(1),
(2) Date: Jun. 5, 2023

(87) PCT Pub. No.: WO2022/123731
PCT Pub. Date: Jun. 16, 2022

(65) Prior Publication Data
US 2024/0042565 A1 Feb. 8, 2024

(51) Int. Cl.
*B23Q 17/09* (2006.01)
*G01L 5/16* (2020.01)
(52) U.S. Cl.
CPC ............ *B23Q 17/0952* (2013.01); *G01L 5/16* (2013.01)

(58) Field of Classification Search
None
See application file for complete search history.

(56) References Cited

U.S. PATENT DOCUMENTS

| 2010/0194377 A1 | 8/2010 | Valenti, III |
| 2014/0216170 A1 | 8/2014 | Ma et al. |
| (Continued) | | |

FOREIGN PATENT DOCUMENTS

| CN | 115297983 A | 11/2022 |
| CN | 115315337 A | 11/2022 |
| (Continued) | | |

OTHER PUBLICATIONS

Jung et al., "Lowering injection amplitude in sensorless control by means of current oversampling", Sep. 2012, ResearchGate, DOI: 10.1109/SLED.2012.6422810, pp. 1-8 (Year: 2012).*

*Primary Examiner* — Mi'schita' Henson
(74) *Attorney, Agent, or Firm* — XSENSUS LLP

(57) ABSTRACT

A processing system includes a cutting tool, a sensor attached to the cutting tool, an analog-to-digital (AD) converter configured to perform sampling on an analog signal output from the sensor to generate a digital signal, and a processing unit. The processing unit is configured to, based on a rotation rate [rpm] of a rotor; an upper-limit period that is an upper-limit value of a process period; and an upper-limit pitch that is an upper-limit value of an angle pitch [degree], determine the process period and a sampling frequency with which the AD converter performs sampling such that a set value of the angle pitch is equal to the upper-limit pitch or less in a time period taken by the rotor to rotate N times with the process period that is equal to the upper-limit period or shorter.

22 Claims, 19 Drawing Sheets

(56) References Cited

U.S. PATENT DOCUMENTS

| | | |
|---|---|---|
| 2015/0261207 A1 | 9/2015 | Wunderlich et al. |
| 2016/0303698 A1 | 10/2016 | Takahash et al. |
| 2017/0059310 A1 | 3/2017 | Cho et al. |
| 2017/0059311 A1 | 3/2017 | Cho et al. |
| 2018/0029185 A1 | 2/2018 | Tanaka |
| 2018/0071876 A1 | 3/2018 | Tanaka |

FOREIGN PATENT DOCUMENTS

| | | | | |
|---|---|---|---|---|
| EP | 621460 A1 | * | 10/1994 | ............... G01D 1/12 |
| JP | S61-71499 A | | 4/1986 | |
| JP | H03-54435 A | | 3/1991 | |
| JP | H11-118625 A | | 4/1999 | |
| JP | 2006-071485 A | | 3/2006 | |
| JP | 2018-024086 A | | 2/2018 | |
| JP | 2018-043317 A | | 3/2018 | |
| JP | 2018-065199 A | | 4/2018 | |
| JP | 2020-089924 A | | 6/2020 | |
| JP | 2020-144148 A | | 9/2020 | |
| JP | 2020-163564 A | | 10/2020 | |
| UA | 121777 U | * | 12/2017 | ............ G05B 19/19 |
| WO | 2015/056495 A1 | | 4/2015 | |

\* cited by examiner

FIG. 21

| | SAMPLING TIME | SENSOR MEASUREMENT VALUE |
|---|---|---|
| SENSOR MEASUREMENT VALUE AT FIRST ROTATION | t1a | s1a |
| | t1b | s1b |
| | t1c | s1c |
| | ⋮ | ⋮ |
| SENSOR MEASUREMENT VALUE AT SECOND ROTATION | t2a | s2a |
| | t2b | s2b |
| | t2c | s2c |
| | ⋮ | ⋮ |
| SENSOR MEASUREMENT VALUE AT THIRD ROTATION | t3a | s3a |
| | t3b | s3b |
| | t3c | s3c |
| | ⋮ | ⋮ |
| SENSOR MEASUREMENT VALUE AT FOURTH ROTATION | t4a | s4a |
| | t4b | s4b |
| | t4c | s4c |
| | ⋮ | ⋮ |
| SENSOR MEASUREMENT VALUE AT FIFTH ROTATION | t5a | s5a |
| | t5b | s5b |
| | t5c | s5c |
| | ⋮ | ⋮ |
| SENSOR MEASUREMENT VALUE AT SIXTH ROTATION | t6a | s6a |
| | t6b | s6b |
| | t6c | s6c |
| | ⋮ | ⋮ |
| SENSOR MEASUREMENT VALUE AT SEVENTH ROTATION | t7a | s7a |
| | t7b | s7b |
| | t7c | s7c |
| | ⋮ | ⋮ |
| | t7z | s7z |

FIG. 22

| SAMPLING TIME | SENSOR MEASUREMENT VALUE |
|---|---|
| t1a | s1a |
| t2a | s2a |
| t3a | s3a |
| t4a | s4a |
| t5a | s5a |
| t6a | s6a |
| t7a | s7a |
| t1b | s1b |
| t2b | s2b |
| t3b | s3b |
| t4b | s4b |
| t5b | s5b |
| t6b | s6b |
| t7b | s7b |
| t1c | s1c |
| t2c | s2c |
| t3c | s3c |
| ⋮ | ⋮ |
| t7z | s7z |

ROTATION PHASE OF CUTTING TOOL: 0 degree ↓ ROTATION PHASE OF CUTTING TOOL: 360 degrees

PROCESSING SYSTEM, DISPLAY SYSTEM, PROCESSING APPARATUS, PROCESSING METHOD, AND RECORD MEDIUM THAT DETERMINES PROCESS PERIOD AND SAMPLING FREQUENCY FOR AD CONVERTER FOR CUTTING TOOL

CROSS-REFERENCE TO RELATED APPLICATION

The present application is based on PCT filing PCT/JP2020/046069, filed Dec. 10, 2020, the entire contents of which are incorporated herein by reference.

TECHNICAL FIELD

The present disclosure relates to a processing system, a display system, a processing apparatus, a processing method, and a record medium.

BACKGROUND ART

Patent Literature 1 (PTL 1: Japanese Unexamined Patent Application Publication No. 2018-43317) discloses the following machine tool. The machine tool includes a rotation axis device having a rotation axis, a sensor attached to the rotation axis device to acquire information related to a phenomenon that periodically occurs in the rotation axis device in synchronization with rotation of the rotation axis, and a control device to control operation of the rotation axis device and acquire the information through the sensor. The control device determines whether or not processing is in a steady state in which there is no change with respect to a command for operation control to the rotation axis device during the processing by rotating the rotation axis device. When the processing is in the steady state, the control device acquires the information through the sensor at a predetermined sampling period and associates the acquired information with a rotation phase of the rotation axis to acquire a change of the phenomenon for one period based on the information acquired over a plurality of rotations of the rotation axis.

CITATION LIST

Patent Literature

PTL 1: Japanese Unexamined Patent Application Publication No. 2018-43317
PTL 2: Japanese Unexamined Patent Application Publication No. 2018-65199
PTL 3: Japanese Unexamined Patent Application Publication No. 2020-144148
PTL 4: Japanese Unexamined Patent Application Publication No. 2018-24086
PTL 5: Japanese Unexamined Patent Application Publication No. 2006-71485
PTL 6: Japanese Unexamined Patent Application Publication No. H11-118625

SUMMARY OF INVENTION

A processing system according to the present disclosure includes a cutting tool, a sensor attached to the cutting tool, an analog-to-digital (AD) converter configured to perform sampling on an analog signal output from the sensor to generate a digital signal, and a processing unit. The processing unit is configured to, based on a rotation rate [rpm] of a rotor that rotates about a rotation axis; an upper-limit period that is an upper-limit value of a process period that is a period with which a predetermined process is performed using the digital signal generated by the AD converter; and an upper-limit pitch that is an upper-limit value of an angle pitch [degree] that is a rotation angle between two adjacent sampling time points in a coordinate system representing a phase at a time point of sampling performed by the AD converter in a rotation circle that is a path of a point that rotates about the rotation axis as the rotor rotates, determine the process period and a sampling frequency with which the AD converter performs sampling such that a set value of the angle pitch is equal to the upper-limit pitch or less in a time period taken by the rotor to rotate N times with the process period that is equal to the upper-limit period or shorter, wherein N and (360/ps) are integers of 2 or greater and are relatively prime, where ps denotes the set value.

A processing apparatus according to the present disclosure includes a first acquisition unit configured to acquire a rotation rate [rpm] of a rotor that rotates about a rotation axis; a second acquisition unit configured to acquire an upper-limit period that is an upper-limit value of a process period that is a period with which a predetermined process is performed using a digital signal generated by an AD converter configured to perform sampling on an analog signal output from a sensor attached to a cutting tool; a third acquisition unit configured to acquire an upper-limit pitch that is an upper-limit value of an angle pitch [degree] that is a rotation angle between two adjacent sampling time points in a coordinate system representing a phase at a time point of sampling performed by the AD converter in a rotation circle that is a path of a point that rotates about the rotation axis as the rotor rotates; and a processing unit configured to, based on the rotation rate acquired by the first acquisition unit, the upper-limit period acquired by the second acquisition unit, and the upper-limit pitch acquired by the third acquisition unit, determine the process period and a sampling frequency with which the AD converter performs sampling such that a set value of the angle pitch is equal to the upper-limit pitch or less in a time period taken by the rotor to rotate N times with the process period that is equal to the upper-limit period or shorter, wherein N and (360/ps) are integers of 2 or greater and are relatively prime, where ps denotes the set value.

A display system according to the present disclosure includes a cutting tool, a sensor attached to the cutting tool, an AD converter configured to perform sampling on an analog signal output from the sensor to generate a digital signal, and a processing apparatus. The processing apparatus is configured to, based on a rotation rate [rpm] of a rotor that rotates about a rotation axis; an upper-limit period that is an upper-limit value of a process period that is a period with which a predetermined process is performed using the digital signal generated by the AD converter; and an upper-limit pitch that is an upper-limit value of an angle pitch [degree] that is a rotation angle between two adjacent sampling time points in a coordinate system representing a phase at a time point of sampling performed by the AD converter in a rotation circle that is a path of a point that rotates about the rotation axis as the rotor rotates, perform a process of displaying the process period and a sampling frequency with which the AD converter performs sampling such that a set value of the angle pitch is equal to the upper-limit pitch or less in a time period taken by the rotor to rotate N times with the process period that is equal to the upper-limit period or shorter, wherein N and (360/ps) are integers of 2 or greater and are relatively prime, where ps denotes the set value.

A display system according to the present disclosure includes a cutting tool, a sensor attached to a rotor attached to the cutting tool, an AD converter configured to perform sampling on an analog signal output from the sensor to generate a digital signal, and a processing apparatus. The processing apparatus is configured to, based on a rotation rate [rpm] of the rotor that rotates about a rotation axis; an upper-limit period that is an upper-limit value of a process period that is a period with which a predetermined process is performed using the digital signal generated by the AD converter; and a set frequency that is a sampling frequency set by a user, perform a process of displaying information that allows recognition of a distribution state of a phase at a time point of sampling in a case where the AD converter performs sampling in accordance with the set frequency with the upper-limit period.

A processing apparatus according to the present disclosure includes a first acquisition unit configured to acquire a rotation rate [rpm] of a rotor that rotates about a rotation axis; a second acquisition unit configured to acquire an upper-limit period that is an upper-limit value of a process period that is a period with which a predetermined process is performed using a digital signal generated by an AD converter configured to perform sampling on an analog signal output from a sensor attached to a cutting tool; a third acquisition unit configured to acquire an upper-limit pitch that is an upper-limit value of an angle pitch [degree] that is a rotation angle between two adjacent sampling time points in a coordinate system representing a phase at a time point of sampling performed by the AD converter in a rotation circle that is a path of a point that rotates about the rotation axis as the rotor rotates; and a display processing unit configured to, based on the rotation rate acquired by the first acquisition unit; the upper-limit period acquired by the second acquisition unit; and the upper-limit pitch acquired by the third acquisition unit, perform a process of displaying the process period and a sampling frequency with which the AD converter performs sampling such that a set value of the angle pitch is equal to the upper-limit pitch or less in a time period taken by the rotor to rotate N times with the process period that is equal to the upper-limit period or shorter, wherein N and (360/ps) are integers of 2 or greater and are relatively prime, where ps denotes the set value.

A processing apparatus according to the present disclosure includes a first acquisition unit configured to acquire a rotation rate [rpm] of a rotor that rotates about a rotation axis, a second acquisition unit configured to acquire an upper-limit period that is an upper-limit value of a process period that is a period with which a predetermined process is performed using a digital signal generated by an AD converter configured to perform sampling on an analog signal output from a sensor attached to a cutting tool, a fourth acquisition unit configured to acquire a set frequency that is a sampling frequency set by a user, and a display processing unit configured to, based on the rotation rate acquired by the first acquisition unit; the upper-limit period acquired by the second acquisition unit; and the set frequency acquired by the fourth acquisition unit, perform a process of displaying information that allows recognition of a distribution state of a phase at a time point of sampling in a case where the AD converter performs sampling in accordance with the set frequency with the upper-limit period.

One aspect of the present disclosure can be realized not only as a processing system including such a characteristic processing unit but also as a semiconductor integrated circuit that realizes part or the whole of the processing system. One aspect of the present disclosure can be realized not only as a display system including such a characteristic processing unit but also as a semiconductor integrated circuit that realizes part or the whole of the display system. In addition, one aspect of the present disclosure can be realized not only as a processing apparatus including such a characteristic processing unit, but also as a semiconductor integrated circuit that realizes part or the whole of the processing apparatus, as a method including processing steps for the processing apparatus, or as a program for causing a computer to execute the processing steps for the processing apparatus.

BRIEF DESCRIPTION OF DRAWINGS

FIG. 21 is a diagram showing an example of sensor measurement values generated by the AD converter in the processing system according to the first embodiment of the present disclosure.

FIG. 22 is a diagram showing an example of sensor measurement values after array process performed by the analysis unit in the processing apparatus according to the first embodiment of the present disclosure.

DESCRIPTION OF EMBODIMENTS

Figure 1:
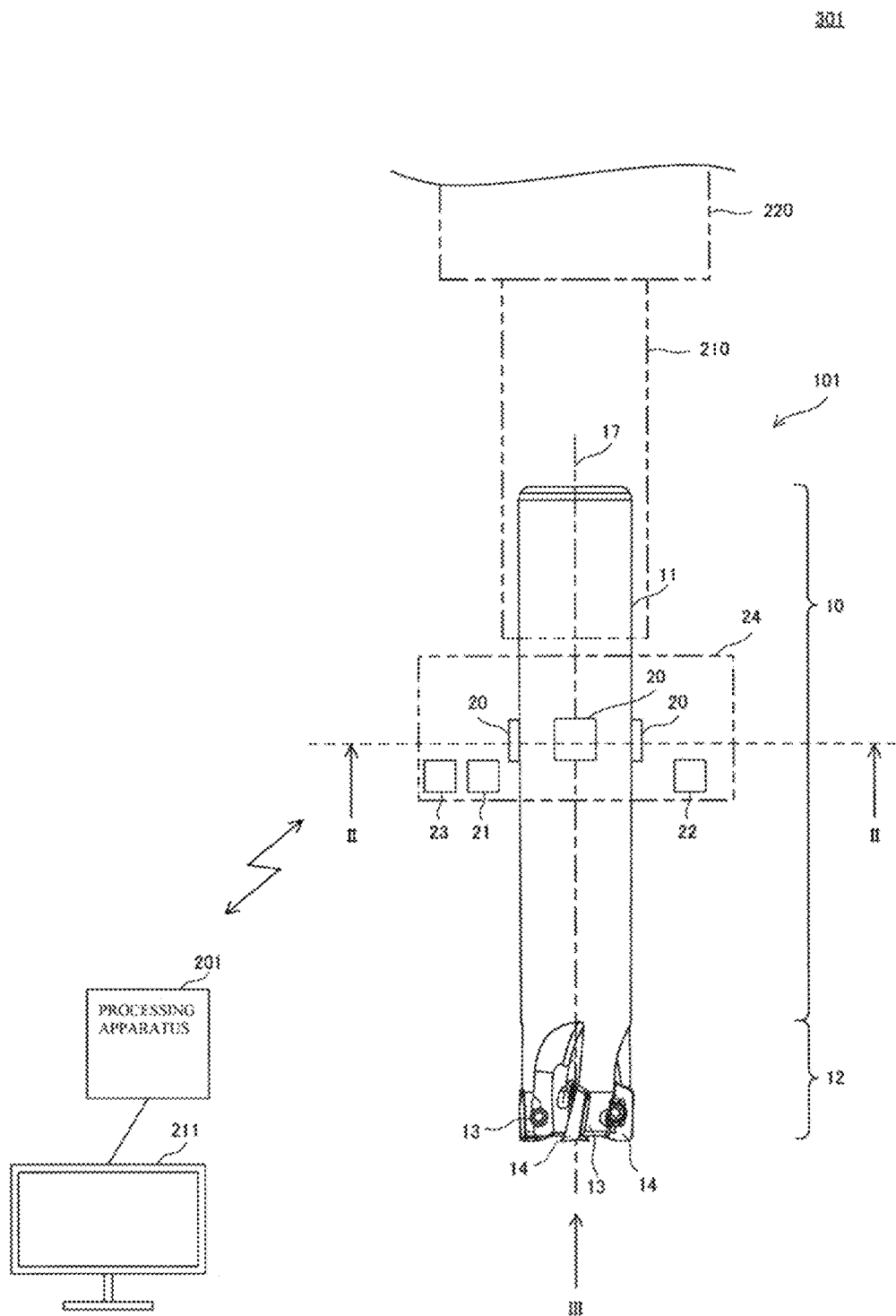
FIG. 1 is a diagram showing a configuration of a processing system according to a first embodiment of the present disclosure.

Conventionally, a technology has been proposed in which a sensor is attached to a cutting tool to perform various processes such as a judgment process related to an abnormality in cutting processing using a digital signal which is generated by performing sampling an analog signal output from the sensor during the cutting processing.

Problems to be Solved by Present Disclosure

Beyond the techniques of PTLs 1 to 4, in a system in which sampling is performed on an analog signal output from a sensor attached to a cutting tool to generate a digital signal, a technique for more efficiently generating a digital signal is desired.

The present disclosure has been made to address the above-mentioned issue. An object of the present disclosure is to provide a processing system, a display system, a processing apparatus, a processing method, and a processing program that allow more efficient generation of a digital signal in a system in which sampling is performed on an analog signal output from a sensor attached to a cutting tool to generate a digital signal.

Advantageous Effects of Present Disclosure

According to the present disclosure, a digital signal can be generated more efficiently in a system in which sampling is performed on an analog signal output from a sensor attached to a cutting tool to generate a digital signal.

Description of Embodiments of Present Disclosure

First, the contents of embodiments according to the present disclosure will be listed and described.

(1) A processing system according to an embodiment of the present disclosure includes a cutting tool, a sensor attached to the cutting tool, an AD converter configured to perform sampling on an analog signal output from the sensor to generate a digital signal, and a processing unit. The processing unit is configured to, based on a rotation rate [rpm] of a rotor that rotates about a rotation axis; an upper-limit period that is an upper-limit value of a process period that is a period with which a predetermined process is performed using the digital signal generated by the AD converter; and an upper-limit pitch that is an upper-limit value of an angle pitch [degree] that is a rotation angle between two adjacent sampling time points in a coordinate system representing a phase at a time point of sampling performed by the AD converter in a rotation circle that is a path of a point that rotates about the rotation axis as the rotor rotates, determine the process period and a sampling frequency with which the AD converter performs sampling such that a set value of the angle pitch is equal to the upper-limit pitch or less in a time period taken by the rotor to rotate N times with the process period that is equal to the upper-limit period or shorter, wherein N and (360/ps) are integers of 2 or greater and are relatively prime, where ps denotes the set value.

As described above, the configuration in which the sampling frequency and the process period with which sampling is performed such that the set value of the angle pitch is equal to the upper-limit pitch or less in the time period taken by the rotor to rotate N times are determined allows generation of digital signals at a larger number of measuring points in the rotation circle even when a low value is set as the sampling frequency of the AD converter. Therefore, digital signals can be generated more efficiently in a system in which sampling is performed on an analog signal output from a sensor attached to a cutting tool to generate a digital signal.

(2) Preferably, the processing unit is configured to determine the sampling frequency and the process period such that N×ps<180 is satisfied.

This configuration allows the sampling frequency and the process period with which the digital signal is generated more efficiently to be determined such that the rotation angle between two measuring points corresponding to two temporally consecutive sampling time points is less than 180 degrees.

(3) Preferably, the processing unit is configured to acquire an upper-limit frequency that is an upper-limit value in the AD converter, and determine the sampling frequency that is equal to the acquired upper-limit frequency or lower.

This configuration allows the sampling frequency to be determined in a settable range of the AD converter.

(4) More preferably, the processing unit is configured to determine a value of N that satisfies the following Expressions (1) to (4), and determine the sampling frequency and the process period, based on the determined value of N.

$$F=(6\times S)/(N\times ps) \quad (1)$$

$$T=(60\times N)/S \quad (2)$$

$$T\leq T\max \quad (3)$$

$$F\leq F\max \quad (4)$$

Here, S denotes the rotation rate, F denotes the sampling frequency, Fmax denotes the upper-limit frequency, T denotes the process period, and Tmax denotes the upper-limit period.

This configuration allows the sampling frequency to be determined in a settable range of the AD converter, and also allows the process period to be determined to be a equal to an upper-limit period set by a user or less, for example.

(5) Preferably, the processing unit is configured to determine, as the process period, a smallest value among values selectable as the process period.

This configuration allows a period with which performing a predetermined process is performed to be set to be shorter, so that, for example, when a judgment process related to an abnormality in the cutting processing is performed as the predetermined process, the abnormality that has occurred can be detected early.

(6) Preferably, the processing system further includes an analysis unit. The analysis unit may be configured to perform, as the predetermined process, a judgment process related to an abnormality in cutting processing in which the cutting tool is used by using the digital signal generated by the AD converter at a timing according to the process period determined by the processing unit.

This configuration allows the judgment process to be performed using a plurality of digital signals that can be regarded as being generated in a time period taken by the cutting tool to rotate once, so that the abnormality in the cutting processing can be accurately determined based on, for example, the average value of the digital signals, and also the abnormality that has occurred can be detected early.

(7) Preferably, the processing system further includes an analysis unit. The analysis unit may be configured to perform a process of generating two-dimensional data at each sampling time relating to loads which the cutting tool receives in two directions, based on the digital signal generated by the AD converter, and perform, as the predetermined process, an update process of updating the two-dimensional data at a timing according to the process period determined by the processing unit.

This configuration allows the two-dimensional data to be updated using a plurality of digital signals that can be regarded as being generated in a time period taken by the cutting tool to rotate once, so that, for example, when an abnormality has occurred in the cutting tool, the influence of the abnormality can be early reflected on the two-dimensional data.

(8) More preferably, the analysis unit is configured to interpolate the digital signal, based on the generated two-dimensional data.

With this configuration, it is possible to acquire a digital signal that can be regarded as being generated by sampling performed at equal time intervals in a time period taken by the cutting tool to rotate once using a digital signal generated by sampling according to the sampling frequency obtained by rounding processing due to hardware restrictions or the like, for example, so that it is possible to perform arithmetic processing such as Fourier transform on the acquired digital signal.

(9) Preferably, the rotor is the cutting tool, and the cutting tool is a milling tool.

This configuration allows a digital signal to be generated more efficiently in a system in which sampling is performed on an analog signal output from a sensor attached to a milling tool to generate a digital signal.

(10) Preferably, the rotor is a workpiece subjected to cutting, and the cutting tool is a turning tool.

This configuration allows a digital signal to be generated more efficiently in a system in which sampling is performed on an analog signal output from a sensor attached to a turning tool to generate a digital signal.

(11) A processing apparatus according to an embodiment of the present disclosure includes a first acquisition unit configured to acquire a rotation rate [rpm] of a rotor that rotates about a rotation axis; a second acquisition unit configured to acquire an upper-limit period that is an upper-limit value of a process period that is a period with which a predetermined process is performed using a digital signal generated by an AD converter configured to perform sampling on an analog signal output from a sensor attached to a cutting tool; a third acquisition unit configured to acquire an upper-limit pitch that is an upper-limit value of an angle pitch [degree] that is a rotation angle between two adjacent sampling time points in a coordinate system representing a phase at a time point of sampling performed by the AD converter in a rotation circle that is a path of a point that rotates about the rotation axis as the rotor rotates; and a processing unit configured to, based on the rotation rate acquired by the first acquisition unit, the upper-limit period acquired by the second acquisition unit, and the upper-limit pitch acquired by the third acquisition unit, determine the process period and a sampling frequency with which the AD converter performs sampling such that a set value of the angle pitch is equal to the upper-limit pitch or less in a time period taken by the rotor to rotate N times with the process period that is equal to the upper-limit period or shorter, wherein N and (360/ps) are integers of 2 or greater and are relatively prime, where ps denotes the set value.

As described above, the configuration in which the sampling frequency and the process period with which sampling is performed such that the set value of the angle pitch is equal to the upper-limit pitch or less in the time period taken by the rotor to rotate N times are determined allows generation of digital signals at a larger number of measuring points in the rotation circle even when a low value is set as the sampling frequency of the AD converter. Therefore, digital signals can be generated more efficiently in a system in which sampling is performed on an analog signal output from a sensor attached to a cutting tool to generate a digital signal.

(12) A processing method according to an embodiment of the present disclosure is a processing method in a processing apparatus. The processing method includes acquiring a rotation rate [rpm] of a rotor that rotates about a rotation axis; acquiring an upper-limit period that is an upper-limit value of a process period that is a period with which a predetermined process is performed using a digital signal generated by an AD converter configured to perform sampling on an analog signal output from a sensor attached to a cutting tool; acquiring an upper-limit pitch that is an upper-limit value of an angle pitch [degree] that is a rotation angle between two adjacent sampling time points in a coordinate system representing a phase at a time point of sampling performed by the AD converter in a rotation circle that is a path of a point that rotates about the rotation axis as the rotor rotates; and based on the acquired rotation rate, the acquired upper-limit period, and the acquired upper-limit pitch, determining the process period and a sampling frequency with which the AD converter performs sampling such that a set value of the angle pitch is equal to the upper-limit pitch or less in a time period taken by the rotor to rotate N times with the process period that is equal to the upper-limit period or shorter, wherein N and (360/ps) are integers of 2 or greater and are relatively prime, where ps denotes the set value.

As described above, the configuration in which the sampling frequency and the process period with which sampling is performed such that the set value of the angle pitch is equal to the upper-limit pitch or less in the time period taken by the rotor to rotate N times are determined allows generation of digital signals at a larger number of measuring points in the rotation circle even when a low value is set as the sampling frequency of the AD converter. Therefore, digital signals can be generated more efficiently in a system in which sampling is performed on an analog signal output from a sensor attached to a cutting tool to generate a digital signal.

(13) A processing program according to an embodiment of the present disclosure is a processing program used in a processing apparatus. The processing program causes a computer to function as a first acquisition unit configured to acquire a rotation rate [rpm] of a rotor that rotates about a rotation axis; a second acquisition unit configured to acquire an upper-limit period that is an upper-limit value of a process period that is a period with which a predetermined process is performed using a digital signal generated by an AD converter configured to perform sampling on an analog signal output from a sensor attached to a cutting tool; a third acquisition unit configured to acquire an upper-limit pitch that is an upper-limit value of an angle pitch [degree] that is a rotation angle between two adjacent sampling time points in a coordinate system representing a phase at a time point of sampling performed by the AD converter in a rotation circle that is a path of a point that rotates about the rotation axis as the rotor rotates; and a processing unit configured to, based on the rotation rate acquired by the first acquisition unit, the upper-limit period acquired by the second acquisition unit, and the upper-limit pitch acquired by the third acquisition unit, determine the process period and a sampling frequency with which the AD converter performs sampling such that a set value of the angle pitch is equal to the upper-limit pitch or less in a time period taken by the rotor to rotate N times with the process period that is equal to the upper-limit period or shorter, wherein N and (360/ps) are integers of 2 or greater and are relatively prime, where ps denotes the set value.

As described above, the configuration in which the sampling frequency and the process period with which sampling is performed such that the set value of the angle pitch is equal to or less than the upper-limit pitch in the time period taken by the rotor to rotate N times are determined allows generation of digital signals at a larger number of measuring points in the rotation circle even when a low value is set as the sampling frequency of the AD converter. Therefore, digital signals can be generated more efficiently in a system in which sampling is performed on an analog signal output from a sensor attached to a cutting tool to generate a digital signal.

(14) A display system according to an embodiment of the present disclosure includes a cutting tool, a sensor attached to the cutting tool, an AD converter configured to perform sampling on an analog signal output from the sensor to generate a digital signal, and a processing apparatus. The processing apparatus is configured to, based on a rotation rate [rpm] of a rotor that rotates about a rotation axis; an upper-limit period that is an upper-limit value of a process period that is a period with which a predetermined process is performed using the digital signal generated by the AD converter; and an upper-limit pitch that is an upper-limit value of an angle pitch [degree] that is a rotation angle between two adjacent sampling time points in a coordinate system representing a phase at a time point of sampling performed by the AD converter in a rotation circle that is a path of a point that rotates about the rotation axis as the rotor rotates, perform a process of displaying the process period and a sampling frequency with which the AD converter performs sampling such that a set value of the angle pitch is equal to the upper-limit pitch or less in a time period taken by the rotor to rotate N times with the process period that is equal to the upper-limit period or shorter, wherein N and (360/ps) are integers of 2 or greater and are relatively prime, where ps denotes the set value.

As described above, the configuration in which a process of displaying the sampling frequency and the process period with which sampling is performed such that the set value of the angle pitch is equal to or less than the upper-limit pitch in the time period taken by the rotor to rotate N times is performed allows a user to recognize the sampling frequency and the process period for generating digital signals at a larger number of measuring points in the rotation circle even when a low value is set as the sampling frequency of the AD converter. Therefore, digital signals can be generated more efficiently in a system in which sampling is performed on an analog signal output from a sensor attached to a cutting tool to generate a digital signal.

(15) Preferably, the processing apparatus is configured to perform a process of displaying information that allows recognition of a distribution state of a phase at a time point of sampling in a case where the AD converter performs sampling in accordance with the sampling frequency in the time period taken by the rotor to rotate N times.

This configuration allows the user to visually recognize the distribution state of the measuring points in a case where sampling is performed in accordance with the determined sampling frequency.

(16) A display system according to an embodiment of present disclosure includes a cutting tool, a sensor attached to a rotor attached to the cutting tool, an AD converter configured to perform sampling on an analog signal output from the sensor to generate a digital signal, and a processing apparatus. The processing apparatus is configured to, based on a rotation rate [rpm] of the rotor that rotates about a rotation axis; an upper-limit period that is an upper-limit value of a process period that is a period with which a predetermined process is performed using the digital signal generated by the AD converter; and a set frequency that is a sampling frequency set by a user, perform a process of displaying information that allows recognition of a distribution state of a phase at a time point of sampling in a case where the AD converter performs sampling in accordance with the set frequency with the upper-limit period As described above, the configuration in which a process of displaying information that allows recognition of a distribution state of a phase at a time point of sampling in a case where the AD converter performs sampling in accordance with the sampling frequency set by a user is performed allows the user to visually recognize the distribution state of the measuring points in a case where sampling is performed in accordance with the sampling frequency set by the user, so that, for example, the user can be prompted to change the sampling frequency in a case where the sampling frequency set by the user is inappropriate. Therefore, a digital signal can be generated more efficiently in a system in which sampling is performed on an analog signal output from a sensor attached to a cutting tool to generate a digital signal.

(17) Preferably, the processing apparatus is configured to, based on the rotation rate, the upper-limit period, and an upper-limit pitch that is an upper-limit value of an angle pitch [degree] that is a rotation angle between two adjacent sampling time points in a coordinate system representing a phase at a time point of sampling performed by the AD converter in a rotation circle that is a path of a point that rotates about the rotation axis as the rotor rotates, perform the process of displaying the information that allows recognition of the distribution state of the phase at the time point of sampling in a case where the AD converter performs sampling in accordance with the sampling frequency with which the AD converter performs sampling such that a set value of the angle pitch is equal to the upper-limit pitch or less in a time period taken by the rotor to rotate N times with the process period that is equal to the upper-limit period or shorter, wherein N and (360/ps) are integers of 2 or greater and are relatively prime, where ps denotes the set value.

This configuration allows the user to visually recognize the distribution state of the measuring points in a case where sampling is performed in accordance with the sampling frequency when an appropriate sampling frequency determined by the processing apparatus is proposed to the user.

(18) Preferably, the processing apparatus is configured to perform a process of displaying at least one of an average value or a maximum value of rotation angles each between two adjacent sampling time points in a coordinate system representing a phase at a time point of sampling performed by the AD converter in a rotation circle that is a path of a point that rotates about the rotation axis as the rotor rotates, in a case where the AD converter performs sampling in accordance with a set frequency that is a sampling frequency set by a user with the upper-limit period.

This configuration allows a user to recognize the average value and the maximum value of the angle pitch in a case where sampling is performed in accordance with the sampling frequency set by the user.

(19) A processing apparatus according to an embodiment of the present disclosure includes a first acquisition unit configured to acquire a rotation rate [rpm] of a rotor that rotates about a rotation axis; a second acquisition unit configured to acquire an upper-limit period that is an upper-limit value of a process period that is a period with which a predetermined process is performed using a digital signal generated by an AD converter configured to perform sampling on an analog signal output from a sensor attached to a cutting tool; a third acquisition unit configured to acquire an upper-limit pitch that is an upper-limit value of an angle pitch [degree] that is a rotation angle between two adjacent sampling time points in a coordinate system representing a phase at a time point of sampling performed by the AD converter in a rotation circle that is a path of a point that rotates about the rotation axis as the rotor rotates; and a display processing unit configured to, based on the rotation rate acquired by the first acquisition unit, the upper-limit period acquired by the second acquisition unit, and the upper-limit pitch acquired by the third acquisition unit, perform a process of displaying the process period and a sampling frequency with which the AD converter performs sampling such that a set value of the angle pitch is equal to the upper-limit pitch or less in a time period taken by the rotor to rotate N times with the process period that is equal to the upper-limit period or shorter, wherein N and (360/ps) are integers of 2 or greater and are relatively prime, where ps denotes the set value.

As described above, the configuration in which the process of displaying the sampling frequency and the process period with which sampling is performed such that the set value of the angle pitch is equal to or less than the upper-limit pitch in the time period taken by the rotor to rotate N times is performed allows a user to recognize the sampling frequency and the process period for generating digital signals at a larger number of measuring points in the rotation circle even when a low value is set as the sampling frequency of the AD converter. Therefore, digital signals can be generated more efficiently in a system in which sampling is performed on an analog signal output from a sensor attached to a cutting tool to generate a digital signal.

(20) A processing apparatus according to an embodiment of present disclosure includes a first acquisition unit configured to acquire a rotation rate [rpm] of a rotor that rotates about a rotation axis, a second acquisition unit configured to acquire an upper-limit period that is an upper-limit value of a process period that is a period with which a predetermined process is performed using a digital signal generated by an AD converter configured to perform sampling on an analog signal output from a sensor attached to a cutting tool, a fourth acquisition unit configured to acquire a set frequency that is a sampling frequency set by a user, and a display processing unit configured to, based on the rotation rate acquired by the first acquisition unit; the upper-limit period acquired by the second acquisition unit; and the set frequency acquired by the fourth acquisition unit, perform a process of displaying information that allows recognition of a distribution state of a phase at a time point of sampling in a case where the AD converter performs sampling in accordance with the set frequency with the upper-limit period.

As described above, the method in which the process of displaying information that allows recognition of the distribution state of the phase at a time point of sampling in a case where the AD converter performs sampling in accordance with the sampling frequency set by the user is performed allows the user to visually recognize the distribution state of the measuring points in a case where sampling is performed in accordance with the sampling frequency set by the user, so that, for example, the user can be prompted to change the sampling frequency in a case where the sampling frequency set by the user is inappropriate. Therefore, a digital signal can be generated more efficiently in a system in which sampling is performed on an analog signal output from a sensor attached to a cutting tool to generate a digital signal.

(21) A processing method according to an embodiment of the present disclosure is a processing method in a processing apparatus. The processing method includes acquiring a rotation rate [rpm] of a rotor that rotates about a rotation axis; acquiring an upper-limit period that is an upper-limit value of a process period that is a period with which a predetermined process is performed using a digital signal generated by an AD converter configured to perform sampling on an analog signal output from a sensor attached to a cutting tool; acquiring an upper-limit pitch that is an upper-limit value of an angle pitch [degree] that is a rotation angle between two adjacent sampling time points in a coordinate system representing a phase at a time point of sampling performed by the AD converter in a rotation circle that is a path of a point that rotates about the rotation axis as the rotor rotates; and based on the acquired rotation rate, the acquired upper-limit period, and the acquired upper-limit pitch, performing a process of displaying the process period and a sampling frequency with which the AD converter performs sampling such that a set value of the angle pitch is equal to the upper-limit pitch or less in a time period taken by the rotor to rotate N times with the process period that is equal to the upper-limit period or shorter, wherein N and (360/ps) are integers of 2 or greater and are relatively prime, where ps denotes the set value.

As described above, the method in which the process of displaying the sampling frequency and the process period with which sampling is performed such that the set value of the angle pitch is equal to or less than the upper-limit pitch in the time period taken by the rotor to rotate N times is performed allows a user to recognize the sampling frequency and the process period for generating digital signals at a larger number of measuring points in the rotation circle even when a low value is set as the sampling frequency of the AD converter. Therefore, digital signals can be generated more efficiently in a system in which sampling is performed on an analog signal output from a sensor attached to a cutting tool to generate a digital signal.

(22) A processing method according to an embodiment of the present disclosure is a processing method in a processing apparatus. The processing method includes acquiring a rotation rate [rpm] of a rotor that rotates about a rotation axis; acquiring an upper-limit period that is an upper-limit value of a process period that is a period with which a predetermined process is performed using a digital signal generated by an AD converter configured to perform sampling on an analog signal output from a sensor attached to a cutting tool; acquiring a set frequency that is a sampling frequency set by a user; and based on the acquired rotation rate, the acquired upper-limit period, and the acquired set frequency, performing a process of displaying information that allows recognition of a distribution state of a phase at a time point of sampling in a case where the AD converter performs sampling in accordance with the set frequency with the upper-limit period.

As described above, the method in which the process of displaying information that allows recognition of the distribution state of the phase at a time point of sampling in a case where the AD converter performs sampling in accordance with the sampling frequency set by the user is performed allows the user to visually recognize the distribution state of the measuring points in a case where sampling is performed in accordance with the sampling frequency set by the user, so that, for example, the user can be prompted to change the sampling frequency in a case where the sampling frequency set by the user is inappropriate. Therefore, a digital signal can be generated more efficiently in a system in which sampling is performed on an analog signal output from a sensor attached to a cutting tool to generate a digital signal.

(23) A processing program according to an embodiment of the present disclosure is a processing program used in a processing apparatus. The processing program causes a computer to function as a first acquisition unit configured to acquire a rotation rate [rpm] of a rotor that rotates about a rotation axis; a second acquisition unit configured to acquire an upper-limit period that is an upper-limit value of a process period that is a period with which a predetermined process is performed using a digital signal generated by an AD converter configured to perform sampling on an analog signal output from a sensor attached to a cutting tool; a third acquisition unit configured to acquire an upper-limit pitch that is an upper-limit value of an angle pitch [degree] that is a rotation angle between two adjacent sampling time points in a coordinate system representing a phase at a time point of sampling performed by the AD converter in a rotation circle that is a path of a point that rotates about the rotation axis as the rotor rotates; and a display processing unit configured to, based on the rotation rate acquired by the first acquisition unit, the upper-limit period acquired by the second acquisition unit, and the upper-limit pitch acquired by the third acquisition unit, perform a process of displaying the process period and a sampling frequency with which the AD converter performs sampling such that a set value of the angle pitch is equal to the upper-limit pitch or less in a time period taken by the rotor to rotate N times with the process period that is equal to the upper-limit period or shorter, wherein N and (360/ps) are integers of 2 or greater and are relatively prime, where ps denotes the set value.

As described above, the configuration in which the process of displaying the sampling frequency and the process period with which sampling is performed such that the set value of the angle pitch is equal to or less than the upper-limit pitch in the time period taken by the rotor to rotate N times is performed allows a user to recognize the sampling frequency and the process period for generating digital signals at a larger number of measuring points in the rotation circle even when a low value is set as the sampling frequency of the AD converter. Therefore, digital signals can be generated more efficiently in a system in which sampling is performed on an analog signal output from a sensor attached to a cutting tool to generate a digital signal.

(24) A processing program according to an embodiment of present disclosure is a processing program used in a processing apparatus. The processing program causes a computer to function as a first acquisition unit configured to acquire a rotation rate [rpm] of a rotor that rotates about a rotation axis; a second acquisition unit configured to acquire an upper-limit period that is an upper-limit value of a process period that is a period with which a predetermined process is performed using a digital signal generated by an AD converter configured to perform sampling on an analog signal output from a sensor attached to a cutting tool; a fourth acquisition unit configured to acquire a set frequency that is a sampling frequency set by a user; and a display processing unit configured to, based on the rotation rate acquired by the first acquisition unit, the upper-limit period acquired by the second acquisition unit, and the set frequency acquired by the fourth acquisition unit, perform a process of displaying information that allows recognition of a distribution state of a phase at a time point of sampling in a case where the AD converter performs sampling in accordance with the set frequency with the upper-limit period.

As described above, the configuration in which the process of displaying information that allows recognition of the distribution state of the phase at a time point of sampling in a case where the AD converter performs sampling in accordance with the sampling frequency set by the user is performed allows the user to visually recognize a distribution state of the measuring points in a case where sampling is performed in accordance with the sampling frequency set by the user, so that, for example, the user can be prompted to change the sampling frequency in a case where the sampling frequency set by the user is inappropriate. Therefore, a digital signal can be generated more efficiently in a system in which sampling is performed on an analog signal output from a sensor attached to a cutting tool to generate a digital signal.

Hereinafter, embodiments according to the present disclosure will be described with reference to the drawings. Note that the same or corresponding parts in the drawings are denoted by the same reference numerals, and description thereof will not be repeated. Further, at least some of the embodiments described below may be arbitrarily combined.

First Embodiment

[Processing System]

FIG. 1 is a diagram showing a configuration of a processing system according to a first embodiment of the present disclosure. Referring to FIG. 1, a processing system 301 includes a cutting tool 101, a strain sensor 20, an AD converter 21, a battery 22, a wireless communication device 23, a processing apparatus 201, and a display device 211. Display device 211 is connected to processing apparatus 201 by a wire, for example. Processing system 301 is an example of a display system. Processing apparatus 201 is an example of a processing unit in processing system 301. Cutting tool 101 is a milling tool and is an example of a rotor. Strain sensor 20 is attached to cutting tool 101.

[Cutting Tool]

Cutting tool 101 is, for example, an end mill used in a machine tool such as a milling machine, and is used for milling processing of a workpiece subjected to cutting which is made of metal or the like. Cutting tool 101 is, for example, an indexable end mill. Cutting tool 101 is used while being held by tool holder 210 such as an arbor.

Cutting tool 101 has a shaft portion 10, a housing 24 and a blade attaching portion 12. Shaft portion 10 includes a shank portion 11. In FIG. 1, housing 24 is indicated by a two-dot chain line which is an imaginary line.

Blade attaching portion 12 is provided at a portion closer to a tip end than shaft portion 10, in cutting tool 101. Blade attaching portion 12 includes four blade fixing portions 13, for example. Chip 14 is attached to each of blade fixing portions 13. Blade attaching portion 12 may be configured to include one, two, or four or more blade fixing portions 13.

Tool holder 210 is mounted on a main shaft 220 of the machine tool. Main shaft 220 has a columnar shape and applies a rotational force to tool holder 210. Tool holder 210 is a columnar member disposed on an extension line of main shaft 220. Specifically, an upper end portion of tool holder 210 is held by main shaft 220. In addition, a lower end portion of tool holder 210 holds shank portion 11 of cutting tool 101.

For example, strain sensor 20 is attached to a peripheral surface of shaft portion 10 through an adhesive or a pressure sensitive adhesive. Strain sensor 20 may be attached to a peripheral surface of tool holder 210.

Housing 24 houses strain sensor 20. Specifically, housing 24 includes a bottom plate portion (not shown) and a side wall portion (not shown). Housing 24 covers strain sensor 20 from below and from the side.

AD converter 21, battery 22, and wireless communication device 23 are housed in housing 24. For example, AD converter 21, battery 22, and wireless communication device 23 are fixed to the bottom plate portion or the side wall portion of housing 24. Wireless communication device 23 includes a communication circuit such as an integrated circuit (IC) for communication. Battery 22 is connected to strain sensor 20, AD converter 21, and wireless communication device 23 through a power line (not shown). Battery 22 supplies power to strain sensor 20, AD converter 21, and wireless communication device 23 through the power line. The power line is provided with a switch for switching on and off of power supply.

For example, processing system 301 includes three strain sensors 20. Processing system 301 may be configured to include a smaller number of strain sensors 20 than the number of chips 14 in cutting tool 101, or may be configured to include a larger number of strain sensors 20 than the number of chips 14 in cutting tool 101. In addition, processing system 301 may be configured to include strain sensors 20 the number of which is not correlated with the number of chips 14 in cutting tool 101.

Figure 2:
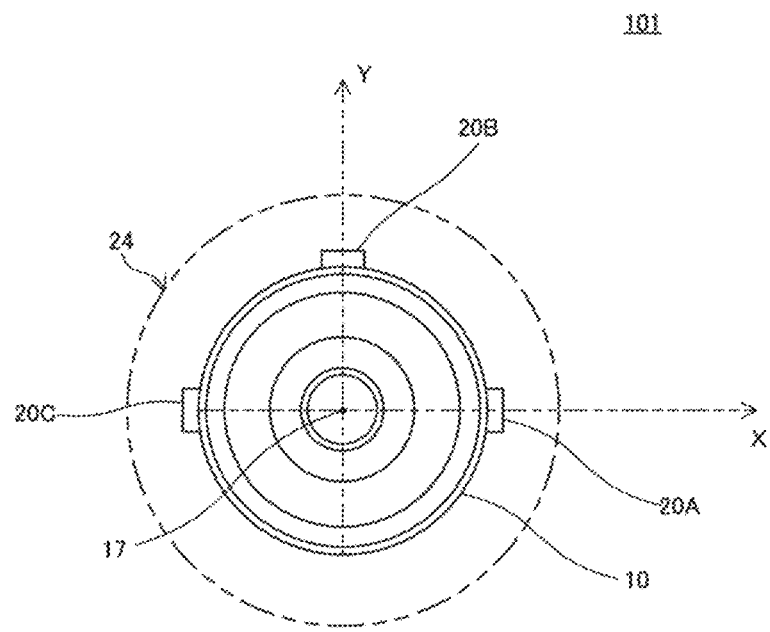
FIG. 2 is a cross-sectional view showing a configuration of a cutting tool according to the first embodiment of the present disclosure.

FIG. 2 is a cross-sectional view showing a configuration of a cutting tool according to the first embodiment of the present disclosure. FIG. 2 is an aligned cross-sectional view taken along line II-II in FIG. 1. Referring to FIG. 2, strain sensors 20A, 20B and 20C are provided at shaft portion 10 as strain sensors 20. Strain sensor 20B is provided at a position shifted by 90° from the position where strain sensor 20C is provided in a peripheral direction of shaft portion 10. Strain sensor 20A is provided at a position shifted by 90° from the position where strain sensor 20B is provided in the peripheral direction of shaft portion 10. Strain sensors 20A and 20C are provided at positions point-symmetrical with respect to rotation axis 17 of shaft portion 10. For example, strain sensors 20A, 20B, and 20C may be each provided at the same position or at different positions in a direction along rotation axis 17 of shaft portion 10.

Strain sensors 20A, 20B, and 20C may be each provided on the peripheral surface of shaft portion 10 or tool holder 210, for example, as described above, regardless of the position of blade attaching portion 12. That is, strain sensors 20A, 20B, and 20C need not be provided at positions along rotation axis 17 from blade fixing portion 13 on the peripheral surface of shaft portion 10 or tool holder 210.

Hereinafter, for the sake of description, in a plane perpendicular to rotation axis 17, a direction from rotation axis 17 to a position where strain sensor 20A is provided is referred to as an X direction, and a direction from rotation axis 17 to a position where strain sensor 20B is provided is referred to as a Y direction.

Strain sensor 20 rotates about rotation axis 17 as cutting tool 101 rotates. The path of strain sensor 20A during the rotation of cutting tool 101 is also referred to as a rotation circle SR. Rotation circle SR is, for example, the path of the center of a contact surface of strain sensor 20A with cutting tool 101 during the rotation of cutting tool 101.

Figure 3:
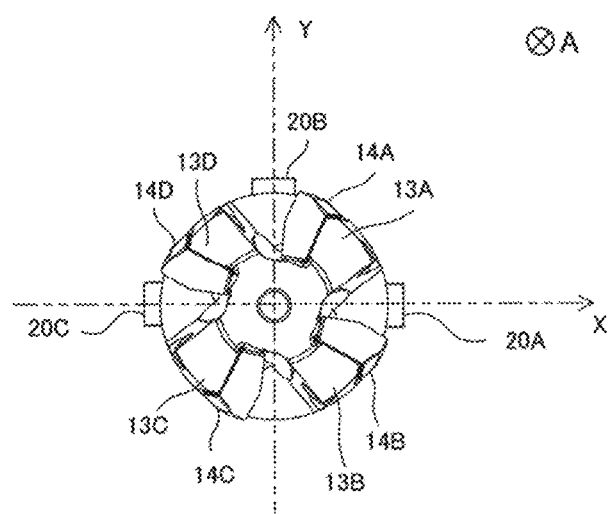
FIG. 3 is an arrow view showing a configuration of a cutting tool according to the first embodiment of the present disclosure.

FIG. 3 is an arrow view showing a configuration of a cutting tool according to the first embodiment of the present disclosure. FIG. 3 is an arrow view seen from a direction III in FIG. 1. Referring to FIG. 3, blade attaching portion 12 includes blade fixing portions 13A, 13B, 13C, and 13D as blade fixing portions 13. Blade fixing portions 13A, 13B, 13C, and 13D are provided in this order at positions each shifted by 90° clockwise in a peripheral direction of blade attaching portion 12. Chips 14A, 14B, 14C, and 14D are mounted to blade fixing portions 13A, 13B, 13C, and 13D, respectively, as chips 14. Each of chips 14A, 14B, 14C and 14D has a cutting blade.

Chip 14 is, for example, a throwaway chip. Chip 14 is mounted to blade fixing portion 13 by screwing, for example. Note that chip 14 may be fixed to blade fixing portion 13 by means other than screwing. Further, cutting tool 101 may be a so-called solid end mill including a cutting blade integrated with shaft portion 10 instead of blade attaching portion 12.

Strain sensor 20 measures a physical quantity representing a state related to a load of cutting tool 101 during cutting processing. More specifically, strain sensor 20 measures a shear strain $\varepsilon$ of shaft portion 10 as the physical quantity representing the state related to the load of cutting tool 101 during the cutting processing.

For example, strain sensor 20 measures a shear strain ε in a time period from time ts, which is the start time of cutting processing, to time te, which is the end time of the cutting processing, and transmits an analog signal with a level corresponding to the shear strain ε to AD converter 21 through a signal line (not shown).

AD converter 21 performs sampling on the analog signal output from strain sensor 20 to generate a sensor measurement value which is a digital signal. More specifically, AD converter 21 performs AD conversion on the analog signal of a shear strain P received from strain sensor 20A to generate a sensor measurement value sx, performs AD conversion on the analog signal of a shear strain ε received from strain sensor 20B to generate a sensor measurement value sy, and performs AD conversion on the analog signal of a shear strain ε received from strain sensor 20C to generate a sensor measurement value sr. AD converter 21 adds a time stamp indicating a sampling time to the generated sensor measurement values sx, sy, and sr, and stores the sensor measurement values sx, sy, and sr to which the time stamp is added in a storage unit (not illustrated).

Wireless communication device 23 acquires one or more sets of sensor measurement values sx, sy, and sr from the storage unit, for example, with a predetermined period to generate a wireless signal including the acquired sensor measurement values sx, sy, and sr and identification information of corresponding strain sensors 20, and transmits the generated wireless signal to processing apparatus 201.

A sampling frequency with which AD converter 21 performs sampling on the analog signal is variable. For example, before starting cutting processing, a user operates an adjustment unit (not illustrated) in AD converter 21 to perform an operation of setting the sampling frequency of AD converter 21. After the cutting processing is started, AD converter 21 performs sampling on the analog signal received from strain sensor 20 in accordance with the sampling frequency set by the user.

[Processing Apparatus]

Figure 4:
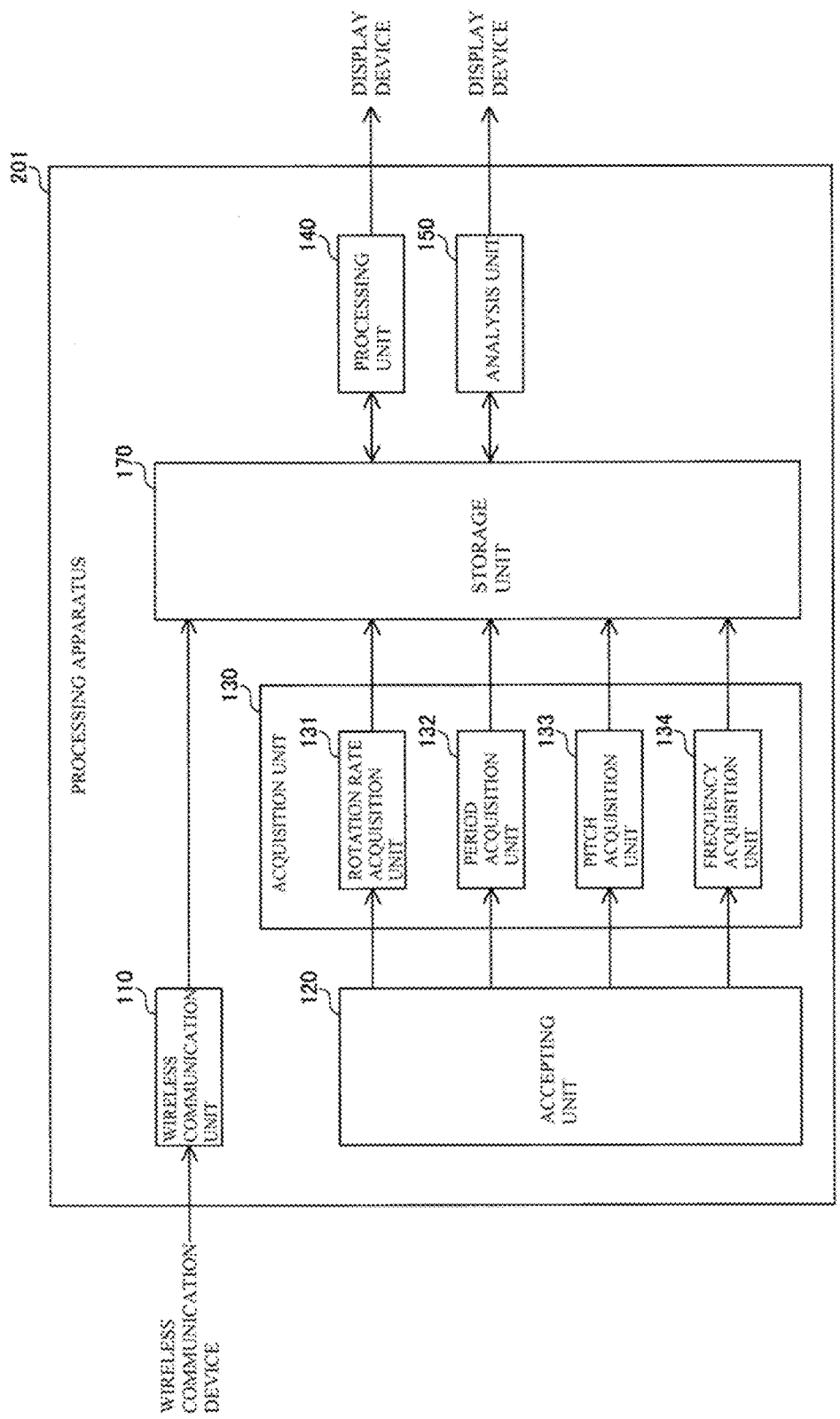
FIG. 4 is a diagram showing a configuration of a processing apparatus in the processing system according to the first embodiment of the present disclosure.

FIG. 4 is a diagram showing a configuration of a processing apparatus in the processing system according to the first embodiment of the present disclosure. Referring to FIG. 4, processing apparatus 201 includes a wireless communication unit 110, an accepting unit 120, an acquisition unit 130, a processing unit 140, an analysis unit 150, and a storage unit 170. Acquisition unit 130 includes a rotation rate acquisition unit 131, a period acquisition unit 132, a pitch acquisition unit 133, and a frequency acquisition unit 134. Processing unit 140 is an example of a display processing unit. Rotation rate acquisition unit 131 is an example of a first acquisition unit. Period acquisition unit 132 is an example of a second acquisition unit. Pitch acquisition unit 133 is an example of a third acquisition unit. Frequency acquisition unit 134 is an example of a fourth acquisition unit.

Wireless communication unit 110 is realized using a communication circuit such as an IC for communication, for example. Acquisition unit 130, processing unit 140, and analysis unit 150 are realized using a processor such as a central processing unit (CPU) and a digital signal processor (DSP). Storage unit 170 is, for example, a nonvolatile memory.

Accepting unit 120 is an input device such as a mouse and a keyboard, and accepts an operation performed by a user on a display image DS1 (to be described later) displayed on display device 211 to generate information representing a content of the accepted operation, and outputs the information to acquisition unit 130.

Wireless communication unit 110 acquires a measurement result of a physical quantity representing a state related to a load of cutting tool 101 during cutting processing, which is the measurement result of strain sensor 20. More specifically, wireless communication unit 110 wirelessly communicates with wireless communication device 23 housed in housing 24 of cutting tool 101. Wireless communication device 23 and wireless communication unit 110 perform wireless communication using a communication protocol such as ZigBee (registered trademark) compliant with IEEE 802.15.4, Bluetooth (registered trademark) compliant with IEEE 802.15.1, and Ultra Wide Band (UWB) compliant with IEEE 802.15.3a. A communication protocol other than those described above may be used between wireless communication device 23 and wireless communication unit 110.

Wireless communication unit 110 acquires sensor measurement values sx, sy, and sr and identification information from a wireless signal received from wireless communication device 23. Wireless communication unit 110 then associates sensor measurement values sx, sy, and sr with the identification information to store them in storage unit 170.

Analysis unit 150 performs a process of generating two-dimensional data D at each sampling time relating to loads which cutting tool 101 receives in two directions based on sensor measurement values sx, sy, and sr generated by AD converter 21.

More specifically, analysis unit 150 generates two-dimensional data D at each sampling time relating to loads in two directions in a plane perpendicular to rotation axis 17 based on sensor measurement values sx, sy, and sr stored in storage unit 170 by wireless communication unit 110.

Figure 5:
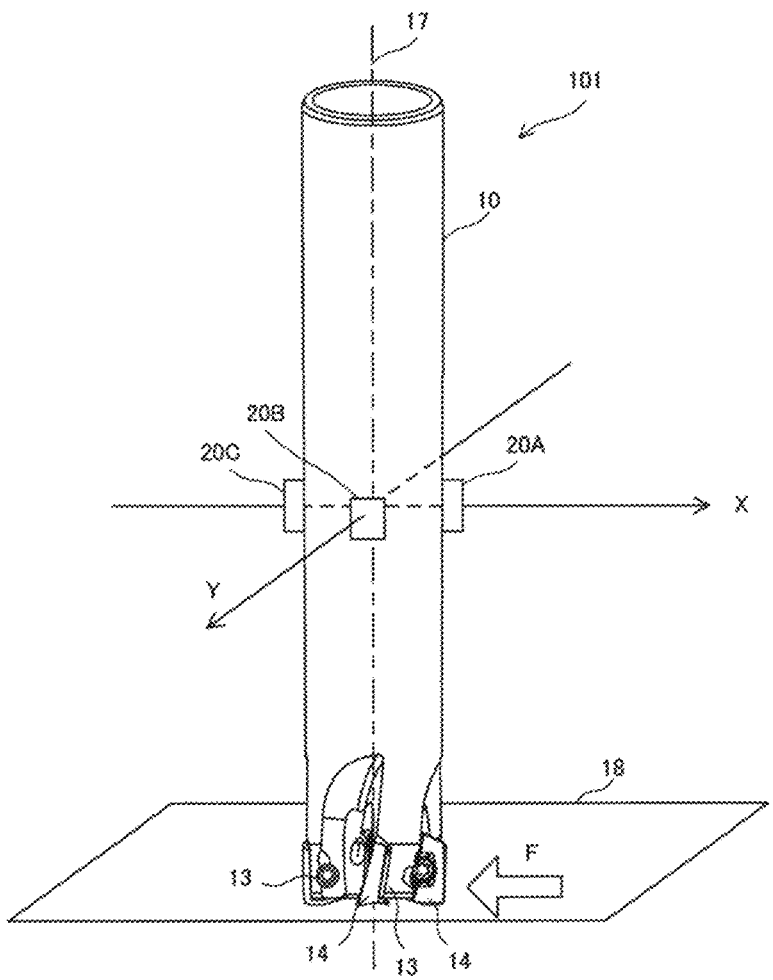
FIG. 5 is a perspective view schematically showing a cutting tool according to the first embodiment of the present disclosure.

FIG. 5 is a perspective view schematically showing a cutting tool according to the first embodiment of the present disclosure. Referring to FIG. 5, when cutting processing is performed with cutting tool 101, in a cutting force exertion plane 18 which is a plane perpendicular to rotation axis 17 and passes through the cutting blade of chip 14, a force, that is, a cutting force F [N] is applied to the cutting blade from a workpiece subjected to cutting.

For example, analysis unit 150 generates two-dimensional data D indicating a force Fx in X direction and a force Fy in Y direction received by cutting tool 101 in cutting force exertion plane 18 based on sensor measurement values sx, sy, and sr. For example, analysis unit 150 also calculates a force Fz in a Z direction and a moment Mz about Z direction based on sensor measurement values sx, sy, and sr.

More specifically, storage unit 170 stores a conversion expression for converting sensor measurement values sx, sy, and sr into forces Fx, Fy, and Fz and a conversion expression for converting sensor measurement values sx, sy, and sr into moment Mz. For example, these conversion expressions are created in advance using techniques described in PTLs 5 and 6, and the like. More specifically, these conversion expressions are conversion matrices that are created in advance based on sensor measurement values sx, sy, and sr acquired when a known force is applied to cutting tool 101.

Analysis unit 150 calculates forces Fx and Fy based on sensor measurement values sx, sy, and sr and the conversion matrices that are stored in storage unit 170 to generate two-dimensional data D indicating the calculated forces Fx and Fy.

Figure 6:
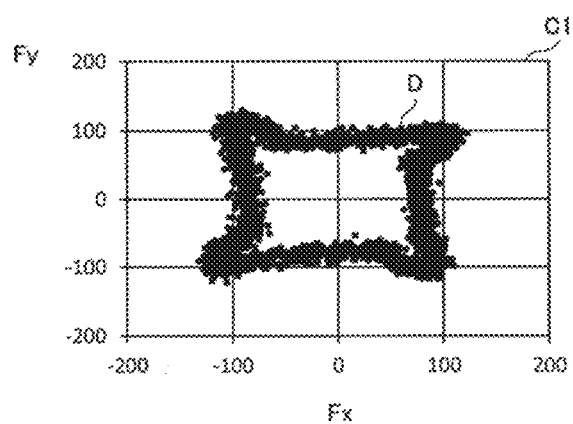
FIG. 6 is a diagram showing an example of two-dimensional data generated by an analysis unit in the processing apparatus according to the first embodiment of the present disclosure.

FIG. 6 is a diagram showing an example of two-dimensional data generated by the analysis unit in the processing apparatus according to the first embodiment of the present disclosure. In FIG. 6, two-dimensional data D generated by analysis unit 150 when cutting processing is performed using cutting tool 101 is shown in two-dimensional coordinates C1 in which a vertical axis represents force Fy [N], a horizontal axis represents force Fx [N], and rotation axis 17 is an origin.

Analysis unit 150 sequentially calculates forces Fx, Fy, and Fz and moment Mz and generates two-dimensional data D. More specifically, analysis unit 150 calculates forces Fx, Fy, Fz and moment Mz and generates two-dimensional data D each time sensor measurement values sx, sy, and sr are stored in storage unit 170 by wireless communication unit 110, and stores the calculated forces Fx, Fy, and Fz, moment Mz, and the generated two-dimensional data D in storage unit 170.

Analysis unit 150 performs a process of displaying two-dimensional data D, based on sensor measurement values sx, sy, and sr generated by AD converter 21. More specifically, upon generating two-dimensional data D, analysis unit 150 performs a process of displaying two-dimensional coordinates C1 including the generated two-dimensional data D on display device 211. Each time analysis unit 150 generates two-dimensional data D, analysis unit 150 performs an update process of updating two-dimensional data D in two-dimensional coordinates C1 displayed on display device 211 to the generated two-dimensional data D. The update process is an example of a predetermined process.

In addition, analysis unit 150 performs a judgment process related to an abnormality in cutting processing in which cutting tool 101 is employed by using sensor measurement values sx, sy, and sr generated by AD converter 21. More specifically, when an abnormality such as a fracture of chip 14 occurs in cutting tool 101, sensor measurement values sx, sy, and sr change due to the occurrence of the abnormality. Analysis unit 150 analyzes sensor measurement values sx, sy, and sr stored in storage unit 170 by wireless communication unit 110 and performs the judgment process based on the analysis result. Analysis unit 150 then performs the process of displaying the judgment result on display device 211. The judgment process is an example of a predetermined process.

<Issues>

In a system in which sampling is performed on an analog signal output from strain sensor 20 attached to cutting tool 101 to generate a digital signal, such as processing system 301, a technique for more efficiently generating a digital signal is desired.

Figure 7:
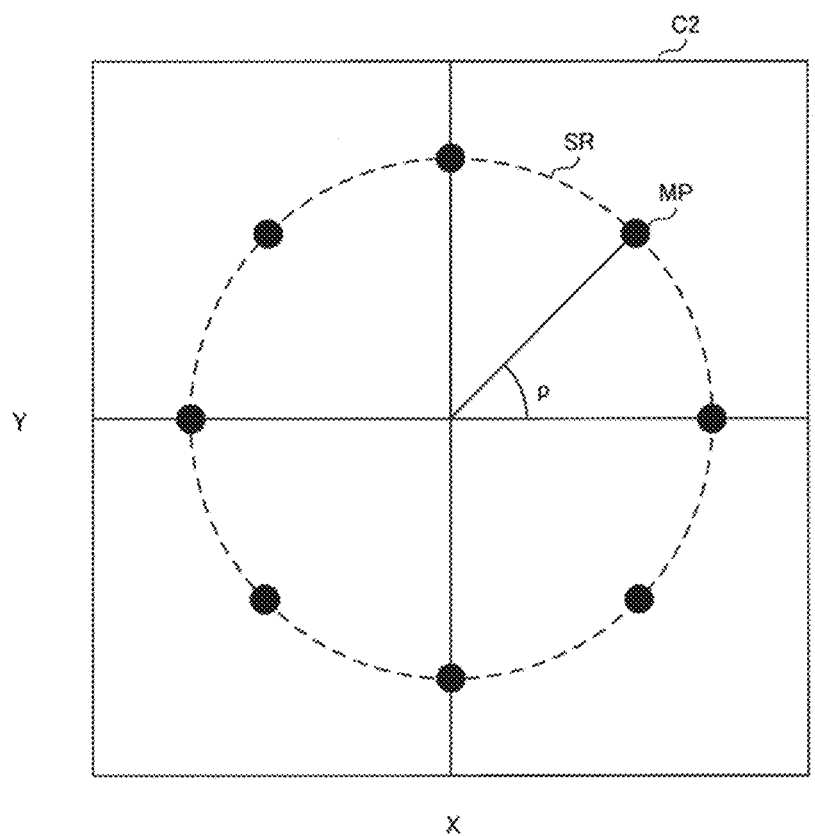
FIG. 7 is an example of a position of a strain sensor 20 at a time point of sampling performed by an AD converter in a processing system according to a comparative example in the first embodiment of the present disclosure.

FIG. 7 is an example of a position of strain sensor 20 at a time point of sampling performed by an AD converter in a processing system according to a comparative example of the first embodiment of the present disclosure. In FIG. 7, a measuring point MP indicating the position of strain sensor 20A at a time point of sampling on a plane perpendicular to rotation axis 17 in a time period taken by cutting tool 101 to rotate multiple times is shown in two-dimensional coordinates C2 with rotation axis 17 as an origin. In this example, cutting tool 101 rotates at a rotation rate S1, AD converter 21 performs sampling with a sampling frequency F1, and S1 and F1 satisfy F1=S1/7.5.

Referring to FIG. 7, there are eight measuring points MP in rotation circle SR when S1 and F1 satisfy F1=S1/7.5. In addition, a rotation angle between two adjacent measuring points MP in two-dimensional coordinates C2, that is, an angle pitch p which is a rotation angle between two adjacent sampling time points is 45 degrees. This is because AD converter 21 performs sampling eight times in a time period taken by cutting tool 101 to rotate once, and measuring point MPn at the n-th rotation of cutting tool 101 and measuring point MP (n+1) at the (n+1)-th rotation of cutting tool 101 overlap with each other in two-dimensional coordinates C2. Here, n is an integer of 1 or greater.

In this case, even when the measurement result by strain sensor 20A is continuously acquired for a long time, sensor measurement values sx generated by AD converter 21 are only sensor measurement values sx at the eight limited measuring points MP. The same applies to the measurement results acquired by strain sensors 20B and 20C. Therefore, for example, when the judgment process is performed by using sensor measurement values sx, sy, and sr, it may not be possible to accurately determine an abnormality in cutting processing.

On the other hand, for example, setting a sampling frequency F2 that is higher than sampling frequency F1, for example, a sampling frequency F2 satisfying F2=6×S1 as the sampling frequency of AD converter 21 allows generation of sensor measurement values sx at a larger number of measuring points MP.

Specifically, there are 360 measuring points MP in rotation circle SR when S1 and F2 satisfy F2=6×S1. In this case, a rotation angle between two adjacent measuring points MP in two-dimensional coordinates C2 is 1 degree. This is because AD converter 21 performs sampling 360 times in a time period taken by cutting tool 101 to rotate once, and measuring point MP at the n-th rotation of cutting tool 101 and measuring point MP at the (n+1)-th rotation of cutting tool 101 overlap with each other in two-dimensional coordinates C2.

However, it is not realistic to set sampling frequency F2 that satisfies F2=6×S1 in terms of the cost of processing system. Specifically, when rotation rate S1 of cutting tool 101 is 2000 rpm, sampling frequency F2 is 12 kHz. In addition, when rotation rate S1 of cutting tool 101 is 40000 rpm, sampling frequency F2 is 240 kHz. Thus, for example, in order to perform sampling with a high sampling frequency of 12 kHz or higher, a high-performance AD converter 21 is required. Further, since the high-performance AD converter 21 is large in size, it may be difficult to construct processing system 301.

In the techniques described in PTLs 1 to 3, it is not possible to determine a sampling frequency for efficiently generating a digital signal in accordance with a rotation rate of a rotor. Further, in the technique described in PTL 4, it is difficult to determine a sampling frequency for efficiently generating a digital signal in a short time.

In contrast, in processing system 301 according to the first embodiment of the present disclosure, the following configuration allows generation of sensor measurement values sx at a larger number of measuring points MP with a low sampling frequency. This will be specifically described below.

<Acquisition Unit>

Rotation rate acquisition unit 131 acquires a rotation rate S [rpm] of cutting tool 101 which is a rotor rotating about rotation axis 17. More specifically, rotation rate acquisition unit 131 acquires rotation rate S of cutting tool 101 set in the machine tool before the start of cutting processing.

Period acquisition unit 132 acquires an upper-limit period Tmax that is an upper-limit value of a process period T that is a period with which a predetermined process such as the above-described judgment process or update process is performed using sensor measurement values sx, sy, and sr generated by AD converter 21. More specifically, period acquisition unit 132 acquires upper-limit period Tmax set by a user before the start of the cutting processing.

Pitch acquisition unit 133 acquires upper-limit pitch pmax that is an upper-limit value of an angle pitch p [degree] that is a rotation angle between two adjacent sampling time points in a coordinate system representing a phase at a time point of sampling performed by AD converter 21 in rotation circle SR. More specifically, pitch acquisition unit 133 acquires upper-limit pitch pmax set by a user before the start of the cutting processing.

Frequency acquisition unit 134 acquires a set frequency Forg that is a sampling frequency set by a user. More specifically, frequency acquisition unit 134 acquires set frequency Forg set by the user before the start of the cutting processing. For example, frequency acquisition unit 134 further acquires an upper-limit frequency Fmax that is an upper-limit value in AD converter 21. Upper-limit frequency Fmax is, for example, an upper-limit value in a specification of AD converter 21.

For example, before the start of the cutting processing, processing unit 140 performs a process of displaying display image DS1 for receiving settings of rotation rate S, upper-limit period Tmax, upper-limit pitch pmax, set frequency Forg, and upper-limit frequency Fmax on display device 211.

Figure 8:
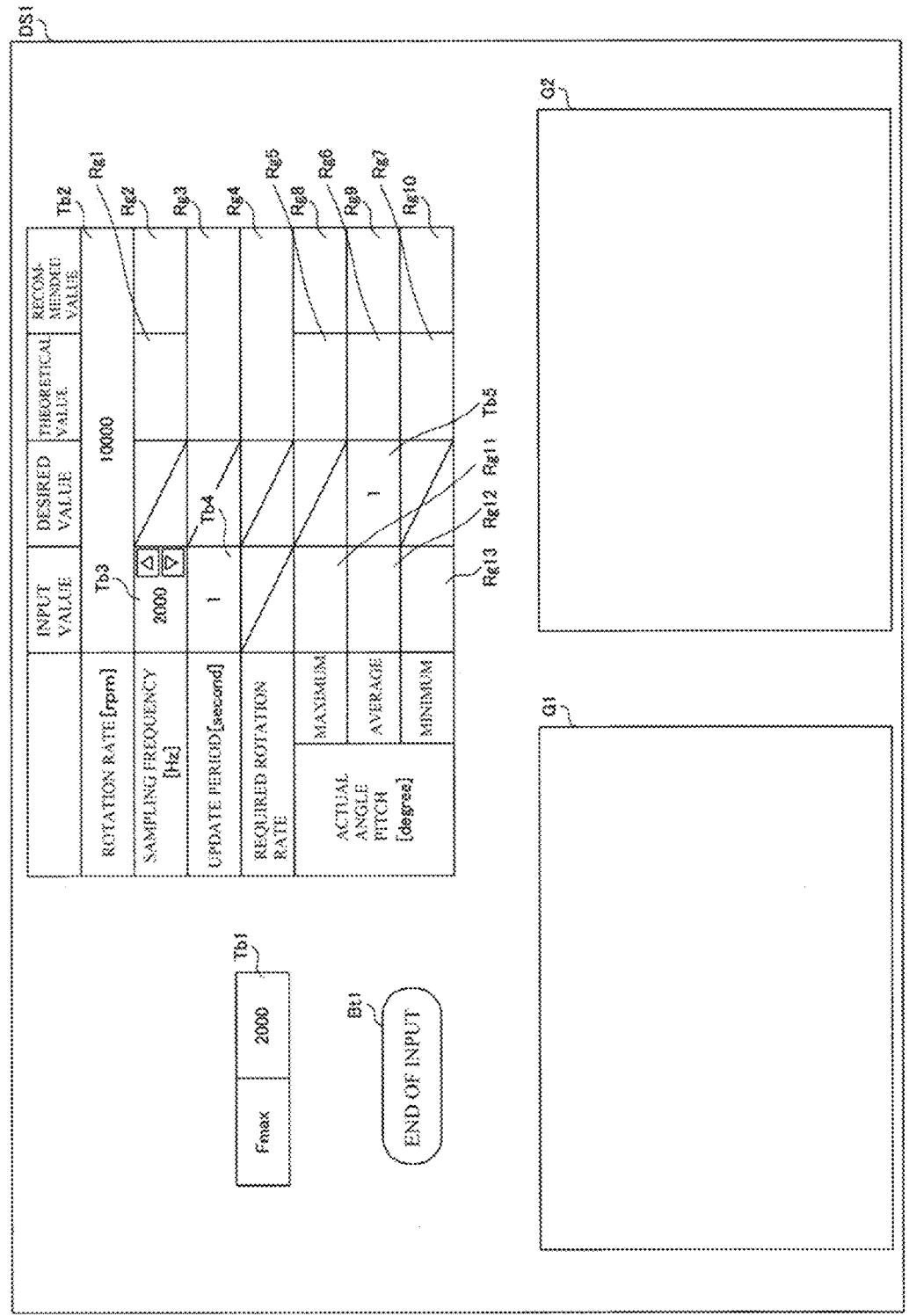
FIG. 8 is an example of a display image displayed on a display device in the processing system according to the first embodiment of the present disclosure.

FIG. 8 is an example of a display image displayed on a display device in the processing system according to the first embodiment of the present disclosure. Referring to FIG. 8, display image DS1 includes text boxes Tb1 to Tb5, regions Rg1 to Rg13, a button Bt1, and graph display regions G1 and G2.

Before the start of cutting processing, a user performs an operation of inputting, for example, upper-limit frequency Fmax described in the specification of AD converter 21 into text box Tb1. The user sets rotation rate S of cutting tool 101 to the machine tool before the start of the cutting processing, and performs an operation of inputting set rotation rate S into text box Tb2. In addition, the user determines set frequency Forg before the start of the cutting processing, and performs an operation of inputting the determined set frequency Forg into text box Tb3. In addition, before the start of the cutting processing, the user determines upper-limit period Tmax based on a period with which the above-described judgment process and update process are to be performed, and performs an operation of inputting the determined upper-limit period Tmax into text box Tb4. Furthermore, before the start of the cutting processing, the user determines upper-limit pitch pmax based on an accuracy required for the judgment process, and performs an operation of inputting the determined upper-limit pitch pmax into text box Tb5. When the user finishes the input operation in text boxes Tb1 to Tb5, the user clicks button Bt1.

Accepting unit 120 accepts an operation by the user to click button Bt1, and performs the following process. That is, accepting unit 120 generates upper-limit frequency information indicating upper-limit frequency Fmax input into text box Tb1, and outputs the upper-limit frequency information to frequency acquisition unit 134. Accepting unit 120 also generates rotation rate information indicating rotation rate S input into text box Tb2, and outputs the rotation rate information to rotation rate acquisition unit 131. In addition, accepting unit 120 generates set frequency information indicating set frequency Forg input into text box Tb3, and outputs the set frequency information to frequency acquisition unit 134. Accepting unit 120 also generates upper-limit period information indicating upper-limit period Tmax input into text box Tb4, and outputs the upper-limit period information to period acquisition unit 132. In addition, accepting unit 120 generates upper-limit pitch information indicating upper-limit pitch pmax input into text box Tb5, and outputs the upper-limit pitch information to pitch acquisition unit 133.

Rotation rate acquisition unit 131 stores the rotation rate information received from accepting unit 120 in storage unit 170. Period acquisition unit 132 stores the upper-limit period information received from accepting unit 120 in storage unit 170. Pitch acquisition unit 133 stores the upper-limit pitch information received from accepting unit 120 in storage unit 170. Frequency acquisition unit 134 stores the upper-limit frequency information and the set frequency information received from accepting unit 120 in storage unit 170.

<Processing Unit>

Processing unit 140 performs a determination process of determining sampling frequency F and process period T in AD converter 21 before the start of cutting processing. Processing unit 140 then performs a display process of displaying the determined sampling frequency F, process period T, and the like on display device 211.

(Determination Process)

Based on rotation rate S acquired by rotation rate acquisition unit 131, upper-limit period Tmax acquired by period acquisition unit 132, and upper-limit pitch pmax acquired by pitch acquisition unit 133, processing unit 140 determines sampling frequency F and process period T with which AD converter 21 performs sampling such that a set value ps of angle pitch p is equal to upper-limit pitch pmax or less in a time period taken by cutting tool 101 to rotate N times with process period T that is equal to upper-limit period Tmax or shorter. Here, N and (360/ps) are integers of 2 or greater and are relatively prime. For example, processing unit 140 determines sampling frequency F that is equal to upper-limit frequency Fmax acquired by frequency acquisition unit 134 or lower.

More specifically, processing unit 140 acquires the rotation rate information, the upper-limit period information, the upper-limit pitch information, and the upper-limit frequency information from storage unit 170. First, processing unit 140 determines set value ps of angle pitch p based on the acquired upper-limit pitch information. For example, processing unit 140 determines set value ps such that set value ps is equal to upper-limit pitch pmax indicated by the upper-limit pitch information or less and (360/ps) is an integer of 2 or greater. As an example, when upper-limit pitch pmax indicated by the upper-limit pitch information is 1 degree, processing unit 140 determines set value ps to be "1".

Processing unit 140 then determines a value of an integer N such that integer N and (360/ps) are relatively prime. Specifically, when set value ps is determined to be "1", processing unit 140 selects the value of integer N from among prime numbers of 7 or more such as 7, 11, 13, 17, 19, 23, 29, 31, 37, and 77 and products of these prime numbers. When set value ps and integer N are determined, processing unit 140 determines sampling frequency F and process period T based on the determined set value ps and integer N.

For example, processing unit 140 determines a value of integer N that satisfies the following Expressions (1) to (4), and determines sampling frequency F and process period T based on the determined value of N.

$$F = (6 \times S)/(N \times ps) \tag{1}$$

$$T = (60 \times N)/S \tag{2}$$

$$T \leq T\text{max} \tag{3}$$

$$F \leq F\text{max} \tag{4}$$

More specifically, processing unit 140 determines a value of integer N such that process period T is equal to upper-limit period Tmax indicated by the acquired upper-limit period information or shorter and sampling frequency F is equal to upper-limit frequency Fmax indicated by the acquired upper-limit frequency information or lower. Processing unit 140 then determines sampling frequency F represented by Expression (1) and process period T represented by Expression (2) based on the determined integer N.

For example, processing unit 140 determines sampling frequency F and process period T so as to satisfy N×ps<180. As described above, the configuration in which sampling frequency F and process period T are determined such that a rotation angle between two measuring points MP corresponding to two temporally consecutive sampling time points is less than 180 degrees allows more efficient generation of sensor measurement values sx, sy, and sr.

Figure 9:
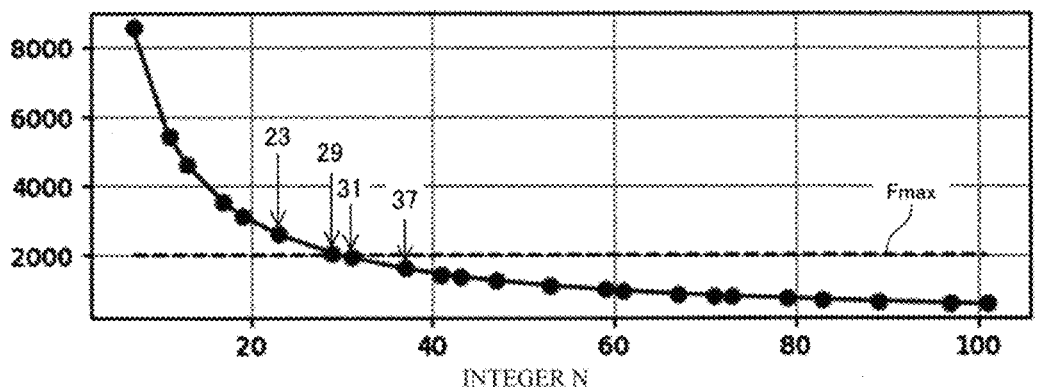
FIG. 9 is a diagram showing an example of a relationship between a selectable integer N and a sampling frequency in a processing unit of the processing apparatus according to the first embodiment of the present disclosure.
Figure 10:
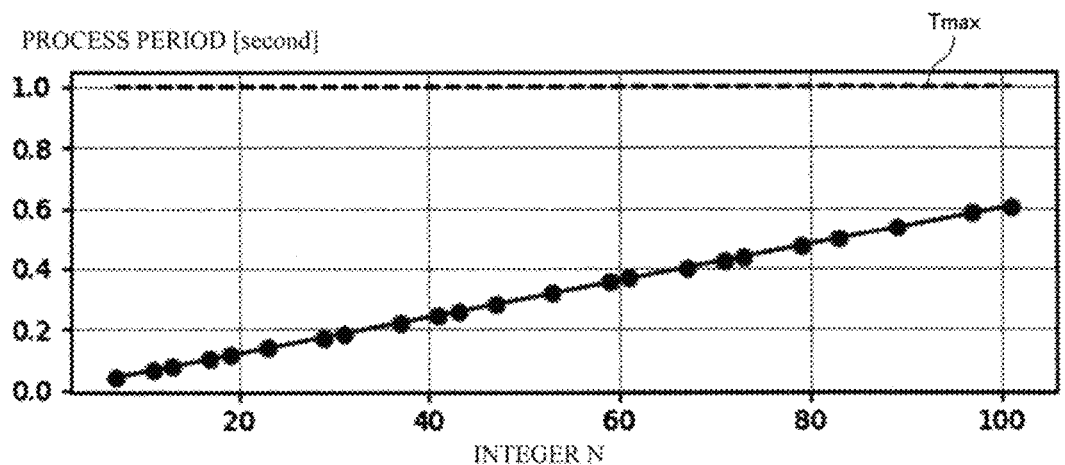
FIG. 10 is a diagram showing an example of a relationship between a selectable integer N and a process period in the processing unit of the processing apparatus according to the first embodiment of the present disclosure.

FIG. 9 is a diagram showing an example of a relationship between a selectable integer N and a sampling frequency in the processing unit of the processing apparatus according to the first embodiment of the present disclosure. FIG. 10 is a diagram showing an example of a relationship between a selectable integer N and a process period in the processing unit of the processing apparatus according to the first embodiment of the present disclosure. In FIG. 9, a vertical axis represents sampling frequency F and a horizontal axis represents a value of integer N. In FIG. 10, a vertical axis represents process period T and a horizontal axis represents a value of integer N. Referring to FIGS. 9 and 10, sampling frequency F is inversely proportional to integer N as shown by Expression (1), and process period T is directly proportional to integer N as shown by Expression (2).

In the example shown in FIGS. 9 and 10, rotation rate S is 10000 rpm, upper-limit frequency Fmax is 2000 Hz, upper-limit period Tmax is 1 second, and set value ps is 1 degree. The dashed lines in FIGS. 9 and 10 indicate upper-limit frequency Fmax and upper-limit period Tmax, respectively. Processing unit 140 selects a value in a range where sampling frequency F in FIG. 9 is equal to a value indicated by the dashed line or less and in a range where process period T in FIG. 10 is equal to a value indicated by the dashed line or less as a value of integer N satisfying Expressions (1) to (4). In this example, a maximum value of integer N in the range where process period T in FIG. 10 is equal to the value indicated by the dashed line or less is 163. That is, processing unit 140 selects a value of integer N from among selection candidates consisting of values of 31 or more and 163 or less among prime numbers of 7 or more such as 31, 37, 41, 43, 47, and 77 and the products of these prime numbers.

For example, processing unit 140 determines, as process period T, a smallest value among values selectable as process period T. More specifically, processing unit 140 selects "31" as a value of integer N from among the above selection candidates in order to minimize a value of process period T. Processing unit 140 then determines process period T to be "0.186 seconds" based on Expression (2). In addition, processing unit 140 determines sampling frequency F to be "1935.48 Hz" based on Expression (1).

Figure 11:
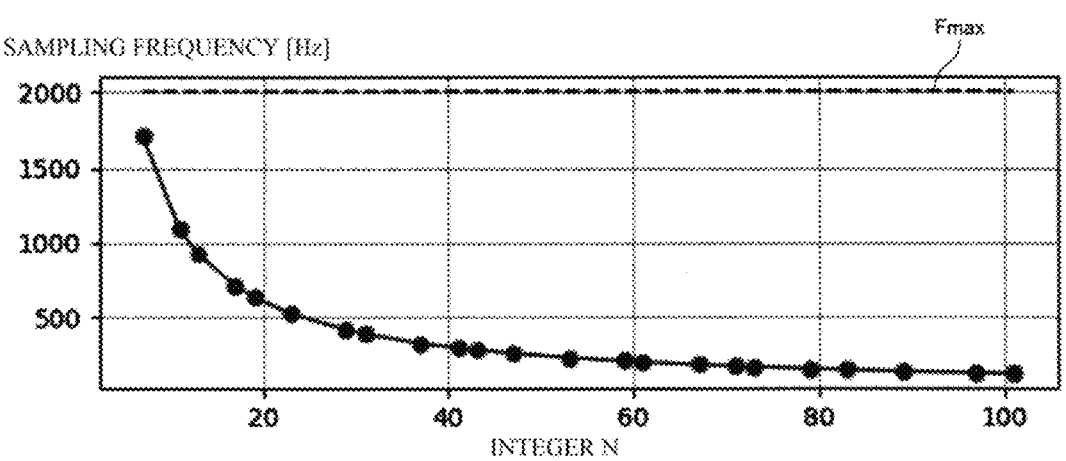
FIG. 11 is a diagram showing another example of a relationship between a selectable integer N and a sampling frequency in the processing unit of the processing apparatus according to the first embodiment of the present disclosure.
Figure 12:
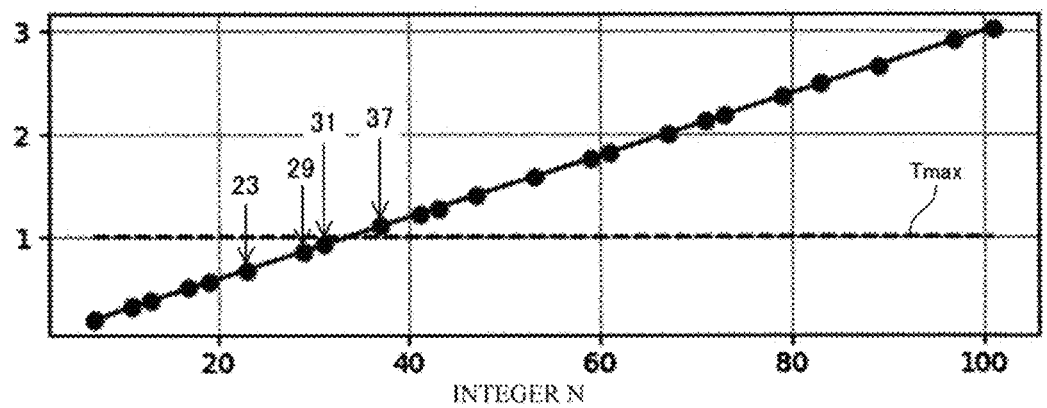
FIG. 12 is a diagram showing another example of a relationship between a selectable integer N and a process period in the processing unit of the processing apparatus according to the first embodiment of the present disclosure.

FIG. 11 is a diagram showing another example of a relationship between a selectable integer N and a sampling frequency in the processing unit of the processing apparatus according to the first embodiment of the present disclosure. FIG. 12 is a diagram showing another example of a relationship between a selectable integer N and a process period in the processing unit of the processing apparatus according to the first embodiment of the present disclosure. In FIG. 11, a vertical axis represents sampling frequency F and a horizontal axis represents a value of integer N. In FIG. 12, a vertical axis represents process period T and a horizontal axis represents a value of integer N.

In the example shown in FIGS. 11 and 12, rotation rate S is 2000 rpm, upper-limit frequency Fmax is 2000 Hz, upper-limit period Tmax is 1 second, and set value ps is 1 degree. The dashed lines in FIGS. 11 and 12 indicate upper-limit frequency Fmax and upper-limit period Tmax, respectively. Processing unit 140 selects a value in a range where sampling frequency F in FIG. 11 is equal to a value indicated by the dashed line or lower and in a range where process period T in FIG. 12 is equal to a value indicated by the dashed line or less as a value of integer N satisfying Expressions (1) to (4). That is, processing unit 140 selects a value of integer N from among selection candidates consisting of values of 31 or less among prime numbers of 7 or more such as 7, 11, 13, 17, 19, 23, 29, and 31 and the products of these prime numbers.

For example, in order to minimize a value of process period T, processing unit 140 selects "7" as a value of integer N from among the above selection candidates. Processing unit 140 then determines process period T to be "0.21 seconds" based on Expression (2). In addition, processing unit 140 determines sampling frequency F to be "1714.2857 Hz" based on Expression (1).

Figure 13:
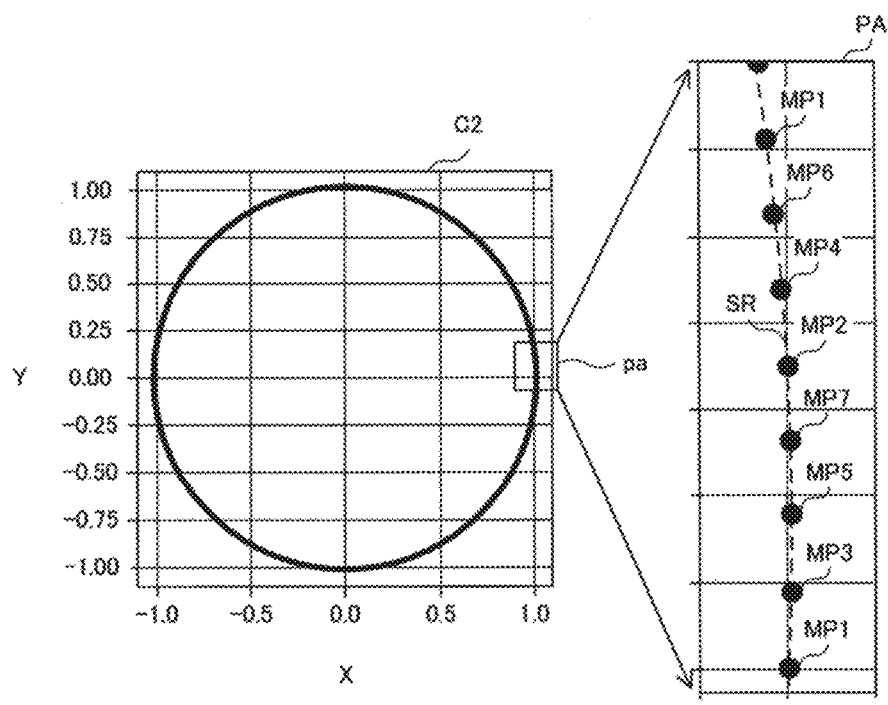
FIG. 13 is an example of a position of a strain sensor at a time point of sampling performed by an AD converter in the processing system according to the first embodiment of the present disclosure.

FIG. 13 is an example of a position of a strain sensor at a time point of sampling by an AD converter in the processing system according to the first embodiment of the present disclosure. A region PA in FIG. 13 is an enlarged view of region pa. In FIG. 13, measuring points MP in a time period taken by cutting tool 101 to rotate seven times are shown in two-dimensional coordinates C2 in a case where AD converter 21 performs sampling in accordance with sampling frequency F of "1714.2857 Hz" which is determined by processing unit 140.

Referring to FIG. 13, measuring point MP1 at the first rotation of cutting tool 101, measuring point MP3 at the third rotation of cutting tool 101, measuring point MP5 at the fifth rotation of cutting tool 101, measuring point MP7 at the seventh rotation of cutting tool 101, measuring point MP2 at the second rotation of cutting tool 101, measuring point MP4 at the fourth rotation of cutting tool 101, and measuring point MP6 at the sixth rotation of cutting tool 101 are arranged in this order in two-dimensional coordinates C2. As described above, since measuring point MPn at the n-th rotation of cutting tool 101 and measuring point MP(n+1) at the (n+1)-th rotation of cutting tool 101 do not overlap with each other in two-dimensional coordinate C2, sensor measurement values sx, sy, and sr for one round of strain sensor 20 corresponding to a large number of measuring points MP can be generated in a pseudo manner in the time period taken by cutting tool 101 to rotate seven times.

At this time, a rotation angle between two measuring points MP corresponding to two temporally consecutive sampling time points, that is, a rotation angle between two adjacent measuring points MPn is represented by N×ps, and is specifically 7 degrees.

Figure 14:
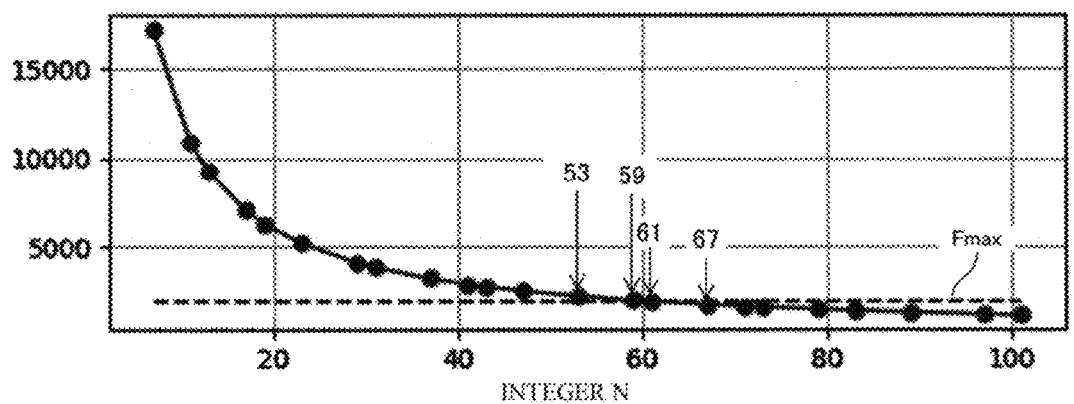
FIG. 14 is a diagram showing another example of a relationship between a selectable integer N and a sampling frequency in the processing unit of the processing apparatus according to the first embodiment of the present disclosure.
Figure 15:
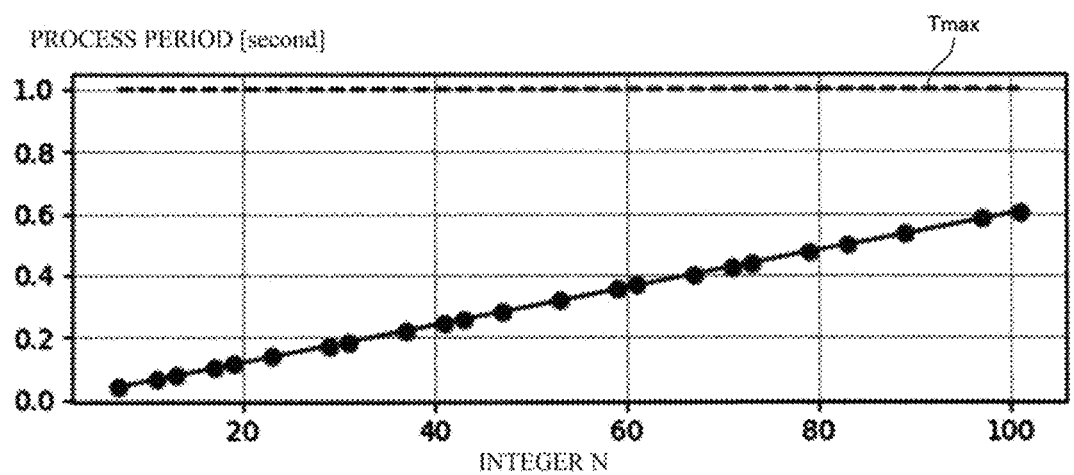
FIG. 15 is a diagram showing another example of a relationship between a selectable integer N and a process period in the processing unit of the processing apparatus according to the first embodiment of the present disclosure.

FIG. 14 is a diagram showing another example of a relationship between a selectable integer N and a sampling frequency in the processing unit of the processing apparatus according to the first embodiment of the present disclosure. FIG. 15 is a diagram showing another example of a relationship between a selectable integer N and a process period in the processing unit of the processing apparatus according to the first embodiment of the present disclosure. In FIG. 14, a vertical axis represents sampling frequency F and a horizontal axis represents a value of integer N. In FIG. 15, a vertical axis represents process period T and a horizontal axis represents a value of integer N.

In the example shown in FIGS. 14 and 15, rotation rate S is 10000 rpm, upper-limit frequency Fmax is 2000 Hz, upper-limit period Tmax is 1 second, and set value ps is 0.5 degrees. The dashed lines in FIGS. 14 and 15 indicate upper-limit frequency Fmax and upper-limit period Tmax, respectively. Processing unit 140 selects a value in a range where sampling frequency F in FIG. 14 is equal to a value indicated by the dashed line or lower and in a range where process period T in FIG. 15 is equal to a value indicated by the dashed line or less as a value of integer N satisfying Expressions (1) to (4). In this example, a maximum value of integer N in the range where process period T in FIG. 15 is equal to the value indicated by the dashed line or less is 163. That is, processing unit 140 selects a value of integer N from among selection candidates consisting of values of 61 or more and 163 or less among prime numbers of 7 or more such as 61, 67, 71, 73, 77, 79, and 83 and the products of these prime numbers.

For example, processing unit 140 selects "61" from among the above selection candidates as a value of integer N in order to minimize a value of process period T. Processing unit 140 then determines process period T to be "0.366 seconds" based on Expression (2). In addition, processing unit 140 determines sampling frequency F to be "1967.21 Hz" based on Expression (1).

When processing unit 140 determines set value ps, integer N, sampling frequency F, and process period T, processing unit 140 stores the respective determined values in storage unit 170.

Processing unit 140 determines sampling frequency F to be "1714.2857 Hz" in the example described with reference to FIGS. 11 and 12. However, due to a specification of AD converter 21, sampling frequency in AD converter 21 may not be able to be finely set down to a decimal place.

For example, processing unit 140 may determine, as sampling frequency F, a value obtained by rounding processing on a sampling frequency calculated based on Expression (1). Specifically, processing unit 140 may determine "1714 Hz", which is a value obtained by rounding off the first decimal place of the sampling frequency calculated based on Expression (1), as sampling frequency F.

Figure 16:
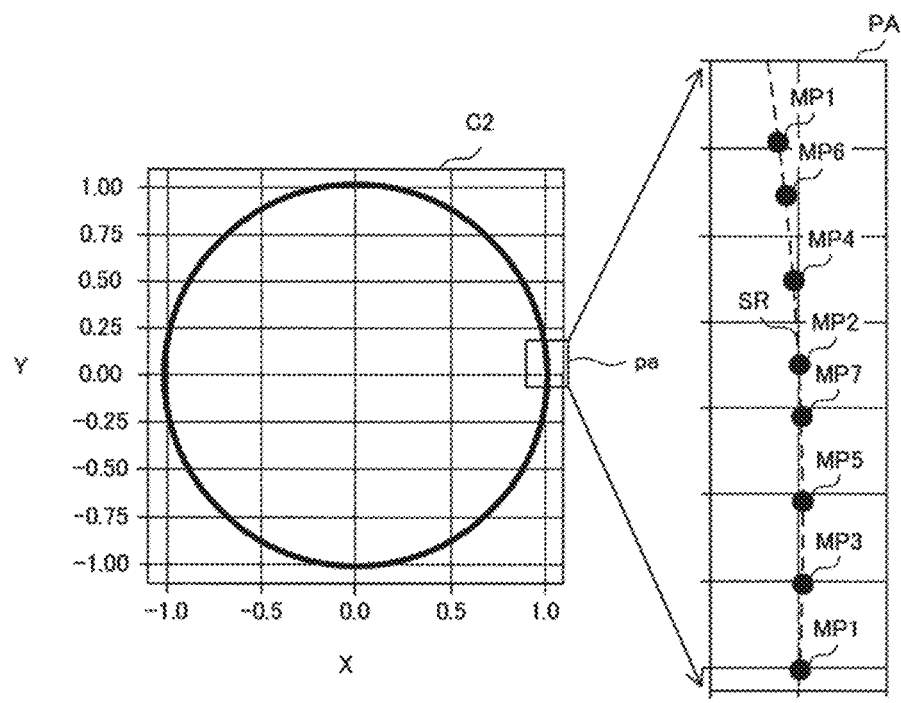
FIG. 16 is an example of a position of the strain sensor at a time point of sampling performed by the AD converter in the processing system according to the first embodiment of the present disclosure.

FIG. 16 is an example of a position of a strain sensor at a time point of sampling performed by an AD converter in the processing system according to the first embodiment of the present disclosure. Region PA in FIG. 16 is an enlarged view of region pa. In FIG. 16, measuring points MP in a time period taken by cutting tool 101 to rotate seven times are shown in two-dimensional coordinates C2 in a case where AD converter 21 performs sampling in accordance with sampling frequency F of "1714 Hz" which is determined by processing unit 140.

Referring to FIG. 13 and FIG. 16, in a case where AD converter 21 performs sampling in accordance with "1714 Hz" which is a value obtained by rounding processing on sampling frequency calculated based on integer N, a variation occurs in angle pitch p as compared with the case where sampling is performed in accordance with "1714.2857 Hz". However, also in the example shown in FIG. 16, sensor measurement values sx, sy, and sr can be efficiently generated as compared with the case where measuring point MPn at the n-th rotation of cutting tool 101 and measuring point MP (n+1) at the (n+1)-th rotation of cutting tool 101 overlap with each other in two-dimensional coordinates C2 as shown in FIG. 7.

For example, processing unit 140 performs a simulation to acquire a maximum value pb1, an average value pb2, and a minimum value pb3 of angle pitch p in a case where sampling is performed in accordance with sampling frequency F of "1714 Hz" which is obtained by rounding processing, and stores the respective acquired values in storage unit 170.

Processing unit 140 may be configured to perform a determination process again to determine a new sampling frequency F and a new process period T when maximum value pb1 is greater than upper-limit pitch pmax. More specifically, processing unit 140 selects another integer N such that maximum value pb1 is equal to upper-limit pitch pmax or less, and performs a redetermination process of determining another sampling frequency F and another process period T based on the selected integer N. For example, a user operates an adjustment unit (not shown) in processing apparatus 201 in advance to perform an operation of setting maximum value pb1 to be equal to upper-limit pitch pmax or less. Processing unit 140 performs a redetermination process when maximum value pb1 is greater than upper-limit pitch pmax in accordance with the setting by the user.

(Display Processing)

Figure 17:
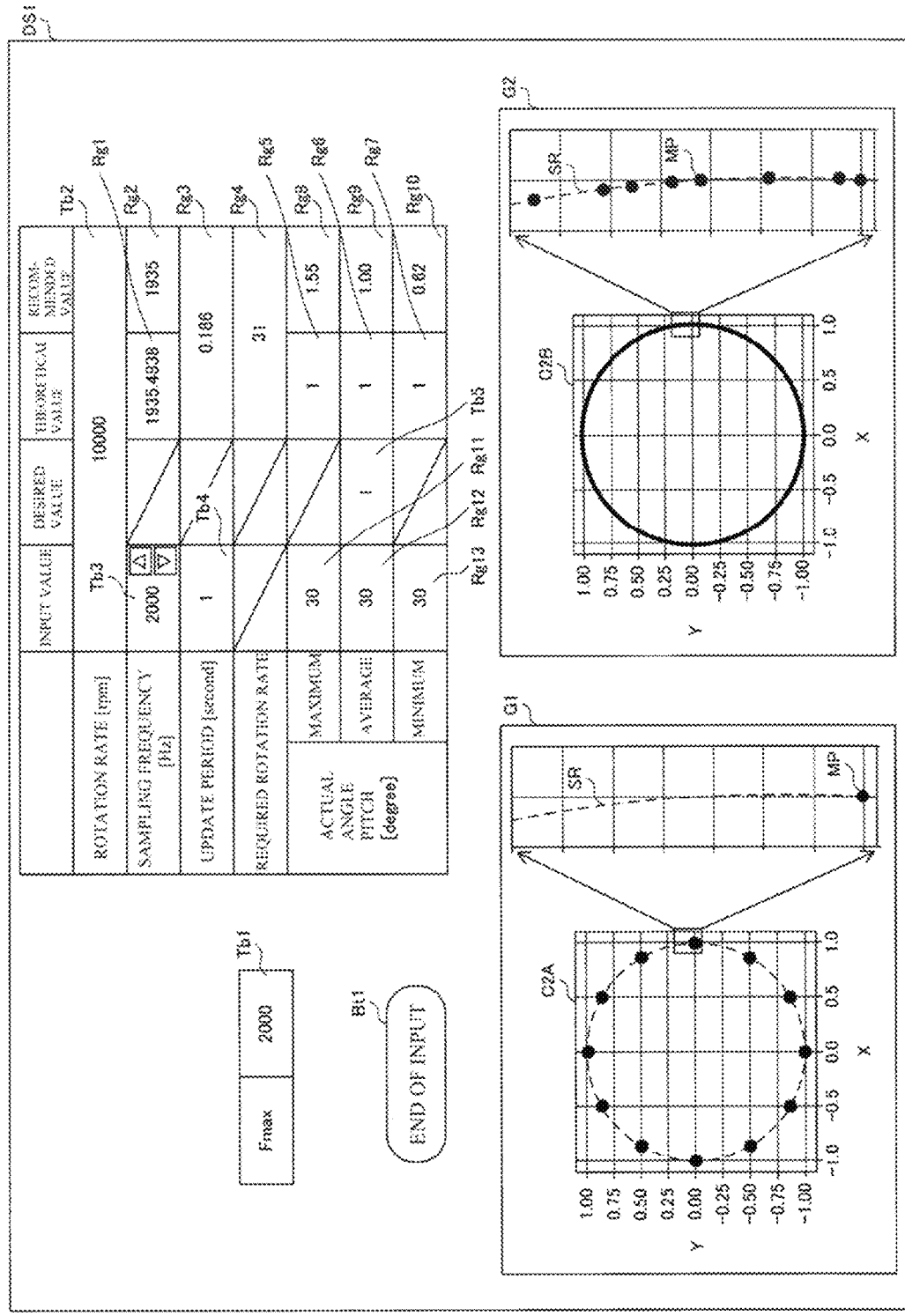
FIG. 17 is an example of a display image displayed on a display device in the processing system according to the first embodiment of the present disclosure.

FIG. 17 shows an example of a display image displayed on a display device in the processing system according to the first embodiment of the present disclosure. Referring to FIG. 17, processing unit 140 performs a process of displaying sampling frequency F and process period T determined in a determination process on display device 211. Specifically, processing unit 140 performs a process of displaying the determined sampling frequency F as a theoretical value in region Rg1 in display image DS1. In addition, processing unit 140 performs a process of displaying, in region Rg2 in display image DS1, sampling frequency F obtained by rounding processing as a recommended value. In addition, processing unit 140 performs a process of displaying the determined process period T in region Rg3 in display image DS1.

For example, processing unit 140 performs a process of displaying, in region Rg4 in display image DS1, a rotation rate of cutting tool 101, that is, a value of integer N, required to generate sensor measurement values sx, sy, and sr for one round of strain sensor 20 in a pseudo manner. In addition, for example, processing unit 140 performs a process of displaying maximum value pa1, average value pa2, and minimum value pa3 of angle pitch p in a case where AD converter 21 performs sampling in accordance with sampling frequency F in regions Rg5, Rg6, and Rg7, respectively. In addition, for example, processing unit 140 performs a process of displaying maximum value pb1, average value pb2, and minimum value pb3 of angle pitch p in a case where AD converter 21 performs sampling in accordance with sampling frequency F obtained by rounding processing in regions Rg8, Rg9, and Rg10, respectively.

Based on rotation rate S, upper-limit period Tmax, and set frequency Forg, processing unit 140 performs a process of displaying information that allows recognition of a distribution state of a phase at a time point of sampling in a case where AD converter 21 performs sampling in accordance with set frequency Forg with upper-limit period Tmax.

More specifically, processing unit 140 acquires rotation rate information, upper-limit period information, and set frequency information from storage unit 170. Based on the rotation rate information, the upper-limit period information, and the set frequency information, processing unit 140 then perform a simulation to acquire measuring point MP at a time point of sampling in a case where AD converter 21 performs sampling in accordance with set frequency Forg indicated by the set frequency information in the time period of upper-limit period Tmax indicated by the upper-limit period information, and performs a process of displaying two-dimensional coordinates C2A that shows the calculated measuring point MP in graph display region G1.

By referring to two-dimensional coordinates C2A, a user recognizes that only 12 measuring points MP are present in rotation circle SR in a case where AD converter 21 performs sampling in accordance with set frequency Forg of "2000 Hz" which is set by the user. That is, even in a case where AD converter 21 performs sampling in a time period of "1 second" which is upper-limit period Tmax set by the user to generate 2000 sensor measurement values sx, sy, and sr, the user recognizes that substantially only 12 sets of sensor measurement values sx, sy, and sr can be acquired.

For example, processing unit 140 performs a process of displaying at least one of an average value or a maximum value of rotation angles each between two adjacent sampling time points in a coordinate system representing a phase at a time point of sampling performed by AD converter 21 in rotation circle SR in a case where AD converter 21 performs sampling in accordance with set frequency Forg with upper-limit period Tmax. More specifically, processing unit 140 performs a simulation to acquire a maximum value pc1, an average value pc2, and a minimum value pc3 of angle pitch p in the case where AD converter 21 performs sampling in accordance with set frequency Forg, and performs a process of displaying the acquired values in regions Rg11, Rg12, and Rg13, respectively.

For example, processing unit 140 performs a process of displaying information that allows recognition of a distribution state of a phase at a time point of sampling in a case where AD converter 21 performs sampling in accordance with sampling frequency F in a time period taken by cutting tool 101 to rotate N times with the determined process period T. That is, based on rotation rate S, upper-limit period Tmax, and upper-limit pitch pmax, processing unit 140 performs the process of displaying information that allows recognition of the distribution state of the phase at the time point of sampling in the case where AD converter 21 performs sampling in accordance with sampling frequency F in the time period taken by cutting tool 101 to rotate N times.

More specifically, for example, processing unit 140 performs a simulation to acquire measuring points MP at time points of sampling in a case where AD converter 21 performs sampling in accordance with sampling frequency F obtained by rounding processing in a time period of process period T, and performs a process of displaying two-dimensional coordinates C2B that shows acquired measuring points MP in a graph display region G2.

By referring to two-dimensional coordinates C2B, a user recognizes that 360 sensor measurement values sx, sy, sr corresponding to 360 measuring points MP at positions separated from each other in rotation circle SR can be acquired in a case where AD converter 21 performs sampling in accordance with sampling frequency F of "1935 Hz" which is obtained by rounding processing and displayed in region Rg2 in a time period of "0.186 seconds" which is process period T displayed in region Rg3

For example, the user refers to display image DS1 to recognize a sampling frequency to be set in AD converter 21. More specifically, the user performs a process of setting, in AD converter 21, sampling frequency F that is obtained by the rounding processing and displayed as a recommended value in region Rg2, for example. The user performs the process of setting sampling frequency F in AD converter 21, and then starts cutting processing.

(Predetermined Process)

For example, as a predetermined process, analysis unit 150 performs a judgment process at a timing according to process period T determined by processing unit 140. More specifically, as described above, analysis unit 150 performs the judgment process at each process period T based on an analysis result of sensor measurement values sx, sy, and sr stored in storage unit 170 by wireless communication unit 110, and displays a judgment result on display device 211.

In addition, for example, analysis unit 150 performs, as a predetermined process, an update process of updating two-dimensional data D at a timing according to process period T determined by processing unit 140. More specifically, as described above, analysis unit 150 generates two-dimensional data D at each process period T based on sensor measurement values sx, sy, and sr. Analysis unit 150 then updates two-dimensional data D in two-dimensional coordinates C1 displayed on display device 211 to the generated two-dimensional data D at each process period T.

In processing apparatus 201, the acquisition of sensor measurement values sx, sy, and sr by wireless communication unit 110, the judgment process by analysis unit 150, and the generation of two-dimensional data D and the update process of two-dimensional data D are performed at each process period T. In a case where analysis unit 150 performs the judgment process and the update process at a timing that does not follow process period T, a plurality of sensor measurement values sx, sy, and sr at some of same measuring points MP in rotation circle SR is subjected to the judgment process and the update process. Therefore, for example, when an average value of sensor measurement values sx, sy, and sr is calculated in the judgment process, an influence of unintended weighting occurs on sensor measurement values sx, sy, and sr at such measuring points MP in the average value, and it may not be possible to accurately determine an abnormality in cutting processing. On the other hand, the configuration in which analysis unit 150 performs the judgment process and the update process at the timing according to process period T allows the judgment process and the update process to be performed by using sensor measurement values sx, sy, and sr for one round of strain sensor 20 generated in a pseudo manner. Therefore, for example, based on the average value of sensor measurement values sx, sy, and sr, it is possible to accurately determine an abnormality in cutting processing. In a case where the judgment process and the update process are performed at a timing that does not follow process period T, analysis unit 150 may be configured to exclude some of sensor measurement values sx, sy, and sr from values subjected to the judgment process and the update process so that the influence of the weighting does not occur.

Figure 18:
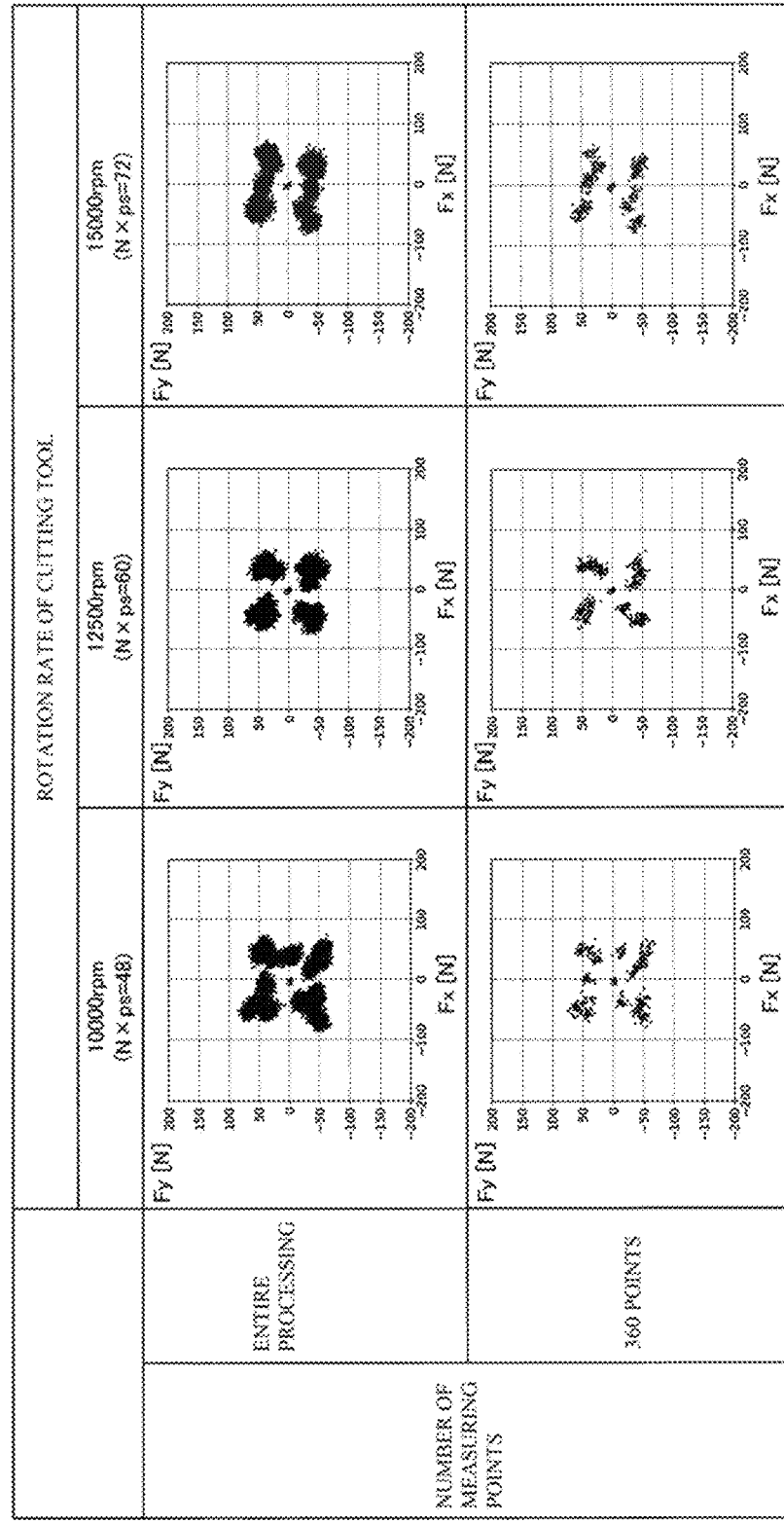
FIG. 18 is a diagram showing an example of two-dimensional data generated by an analysis unit in the processing apparatus according to the comparative example of the first embodiment of the present disclosure.

FIG. 18 is a diagram showing an example of two-dimensional data generated by an analysis unit in the processing apparatus according to the comparative example of the first embodiment of the present disclosure. In FIG. 18, two-dimensional data D based on all sensor measurement values sx, sy, sr in the entire processing time period and two-dimensional data D based on 360 sensor measurement values sx, sy, sr in part of the processing time period that are generated in a case where sampling is performed in accordance with a sampling frequency of "1.25 kHz" which does not satisfy the above Expression (1) are shown when rotation rate S of cutting tool 101 is set to "10000 rpm", "12500 rpm", and "15000 rpm".

Figure 19:
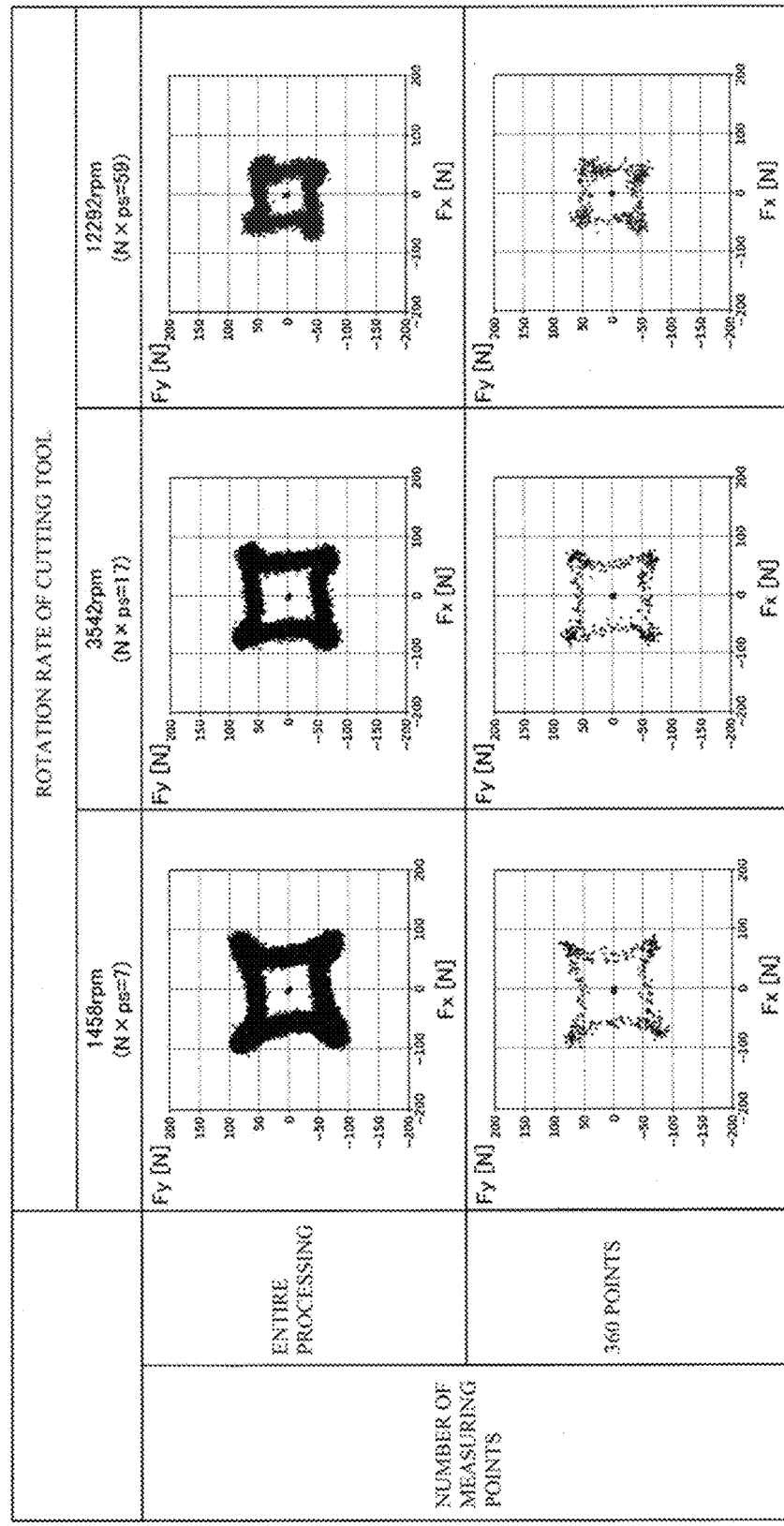
FIG. 19 is a diagram showing an example of two-dimensional data generated by the analysis unit in the processing apparatus according to the first embodiment of the present disclosure.

FIG. 19 is a diagram showing an example of two-dimensional data generated by the analysis unit in the processing apparatus according to the first embodiment of the present disclosure. In FIG. 19, two-dimensional data D based on all sensor measurement values sx, sy, sr in the entire processing time period and two-dimensional data D based on 360 sensor measurement values sx, sy, sr in part of the processing time period that are generated in a case where sampling is performed in accordance with a sampling frequency of "1.25 kHz" which satisfies the above Expression (1) are shown when rotation rate S of cutting tool 101 is set to "1458 rpm", "3542 rpm", and "12292 rpm".

Referring to FIGS. 18 and 19, since two-dimensional data D shown in FIG. 18 which is generated by analysis unit 150 in processing apparatus 201 according to the comparative example is generated based on sensor measurement values sx, sy, and sr at fewer measuring points MP due to the occurrence of bias in measuring points MP in rotation circle SR, it is difficult to grasp the continuity of a two-dimensional shape. On the other hand, since two-dimensional data D shown in FIG. 19 which is generated by analysis unit 150 in processing apparatus 201 is generated based on sensor measurement values sx, sy, and sr at more measuring points MP, the continuity of the two-dimensional shape can be grasped more accurately.

Figure 20:
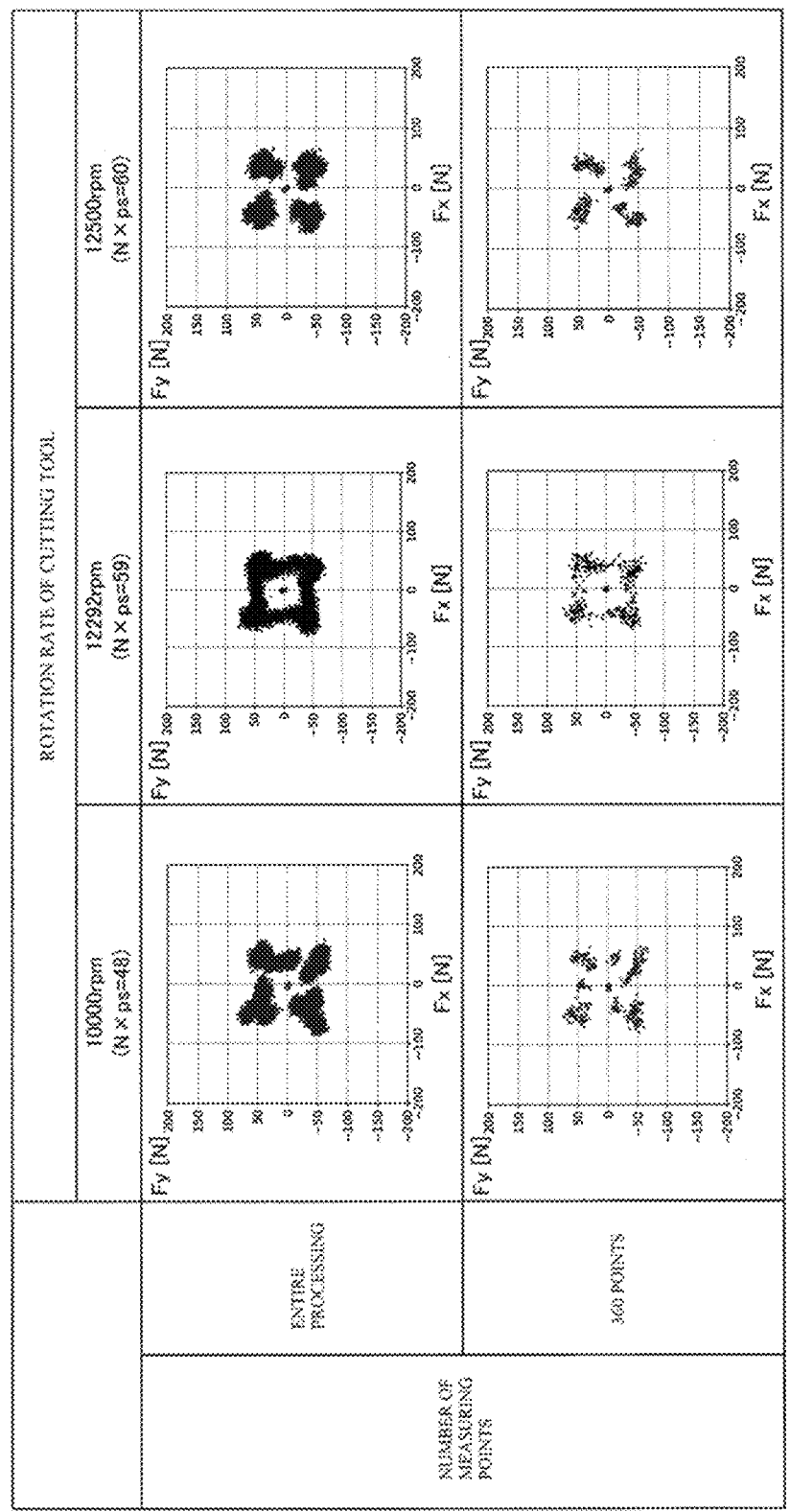
FIG. 20 is a diagram showing two-dimensional data generated by the analysis unit in the processing apparatus according to the first embodiment of the present disclosure.

FIG. 20 is a diagram showing two-dimensional data generated by the analysis unit in the processing apparatus according to the first embodiment of the present disclosure. FIG. 20 is a diagram in which two-dimensional data D corresponding to rotation rate S of "10000 rpm" in FIG. 18, two-dimensional data D corresponding to rotation rate S of "12292 rpm" in FIG. 19, and two-dimensional data D corresponding to rotation rate S of "12500 rpm" in FIG. 18 are shown for comparison.

Referring to FIG. 20, the continuity of the two-dimensional shape can be grasped more accurately in two-dimensional data D generated when rotation rate S is 12292 rpm and the sampling frequency is 1.25 kHz than in two-dimensional data D generated when rotation rate S is 12500 rpm and the sampling frequency is 1.25 kHz. As described above, even when a sampling frequency is low, the sampling frequency is set appropriately in consideration of the relationship with rotation rate S to efficiently generate sensor measurement values sx, sy, and sr.

As described above, when AD converter 21 performs sampling in accordance with sampling frequency F obtained by rounding processing, variation in angle pitch p occurs.

For example, analysis unit 150 performs interpolation of sensor measurement values sx, sy, and sr based on the generated two-dimensional data D. Analysis unit 150 interpolates sensor measurement values sx, sy, and sr that AD converter 21 performs sampling in accordance with sampling frequency F obtained by rounding processing to convert the sensor measurement values sx, sy, and sr into sensor measurement values sx, sy, and sr to be generated in a case where AD converter 21 performs sampling in accordance with sampling frequency F having a value before the rounding processing. More specifically, first, analysis unit 150 rearranges time-series sensor measurement values sx, sy, and sr based on the generated two-dimensional data D.

FIG. 21 is a diagram showing an example of sensor measurement values generated by an AD converter in the processing system according to the first embodiment of the present disclosure. In FIG. 21, sensor measurement values sx, sy, and sr for one round of strain sensor 20 generated in a pseudo manner in a time period taken by cutting tool 101 to rotate seven times are shown.

Referring to FIG. 21, analysis unit 150 classifies sensor measurement values sx, sy, and sr into sensor measurement values generated by AD converter 21 at the first rotation, the second rotation, the third rotation, the fourth rotation, the fifth rotation, the sixth rotation, and the seventh rotation of cutting tool 101 based on vector information included in the generated two-dimensional data D. The sensor measurement values generated by AD converter 21 at the first rotation, the second rotation, the third rotation, the fourth rotation, the fifth rotation, the sixth rotation, and the seventh rotation of cutting tool 101 correspond to sensor measurement values at measuring points MP1, MP2, MP3, MP4, MP5, MP6 and MP7 shown in FIG. 11, respectively.

Analysis unit 150 then performs an array process of rearranging sensor measurement values sx, sy, and sr in order corresponding to a rotation phase of cutting tool 101 based on the classification result. For example, analysis unit 150 also rearranges time-series data of scalar values such as force Fz and moment Mz.

FIG. 22 is a diagram showing an example of sensor measurement values after array process performed by the analysis unit in the processing apparatus according to the first embodiment of the present disclosure. Referring to FIG. 22, in sensor measurement values sx, sy, and sr after the array process, analysis unit 150 corrects each of sensor measurement values sx, sy, and sr by using, for example, sensor measurement values sx, sy, and sr adjacent to the sensor measurement values sx, sy, and sr in the array order. Analysis unit 150 stores the corrected sensor measurement values sx, sy, and sr in storage unit 170.

[Operation Flow]

Each device in the processing system according to the embodiment of the present disclosure includes a computer having a memory. An arithmetic processing unit such as a CPU in the computer reads out a program including some or all of steps in the following flowcharts and sequences from the memory to execute the program. The programs for these multiple devices are each distributed in a state of being stored in a recording medium such as a hard disk drive (HDD), a compact disc read only memory (CD-ROM), a digital versatile disk read only memory (DVD-ROM), or a semiconductor memory. The programs for these multiple devices can be each installed from the outside. For example, the programs for these multiple devices can be installed from the recording medium. In addition, for example, the programs for the multiple devices can be downloaded and installed from a predetermined server or the like via a network represented by an electric communication line, a wireless communication line, a wired communication line, and the Internet. Further, for example, the programs for these multiple devices can be downloaded and installed from a predetermined server or the like by data broadcasting or the like.

Figure 23:
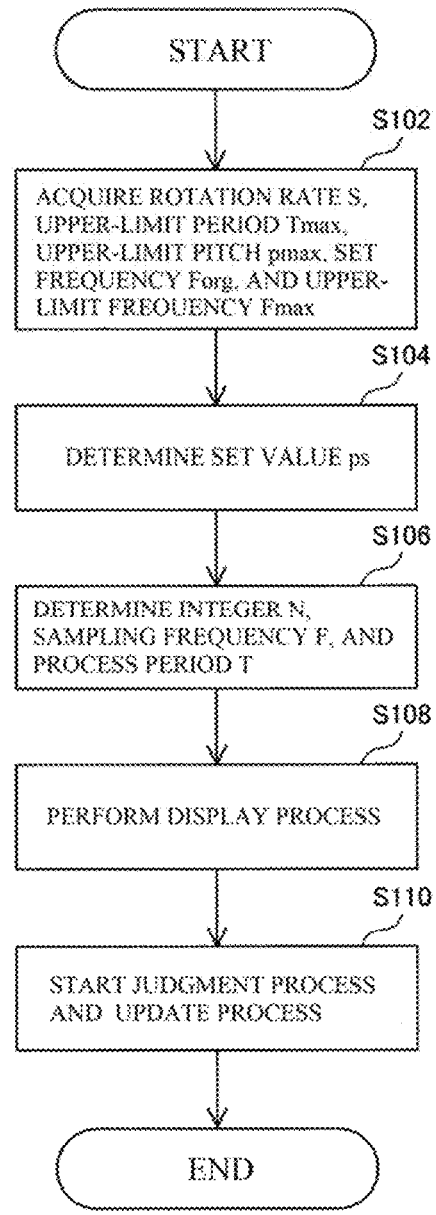
FIG. 23 is a flowchart defining an example of an operation procedure in a case where the processing apparatus in the processing system according to the first embodiment of the present disclosure performs a determination process and a display process.

FIG. 23 is a flowchart defining an example of an operation procedure when the processing apparatus in the processing system according to the first embodiment of the present disclosure performs a determination process and a display process. Referring to FIG. 23, first, processing apparatus 201 acquires rotation rate S, upper-limit period Tmax, upper-limit pitch pmax, set frequency Forg, and upper-limit frequency Fmax of cutting tool 101 (step S102).

Next, processing apparatus 201 determines set value ps of angle pitch p based on upper-limit pitch pmax (step S104).

Next, processing apparatus 201 determines integer N, sampling frequency F, and process period T based on the above-described Expressions (1) to (4) (step S106).

Next, processing apparatus 201 performs a display process. Specifically, processing apparatus 201 performs a process of displaying, on display device 211, display image DS1 including integer N, sampling frequency F, process period T, sampling frequency F obtained by rounding processing, maximum values pa1, pb1, and pc1 of angle pitch p, average values pa2, pb2, pc2 of angle pitch p, minimum values pa3, pb3, pc3 of angle pitch p, two-dimensional coordinates C2B indicating a simulation result of measuring points MP at time points of sampling in a case where AD converter 21 performs sampling in accordance with sampling frequency F, and two-dimensional coordinates C2A indicating a simulation result of measuring points MP at time points of sampling in a case where AD converter 21 performs sampling in accordance with set frequency Forg (step S108).

Next, after starting cutting processing, processing apparatus 201 starts a judgment process and an update process using sensor measurement values sx, sy, and sr generated by AD converter 21. Processing apparatus 201 performs, as a predetermined process, the judgment process and the update process at each process period T (step S110).

Modification

Processing system 301 according to the embodiment of the present disclosure is configured to include processing apparatus 201 separately from cutting tool 101. However, the present disclosure is not limited to this configuration. Processing apparatus 201 may be configured to be included in cutting tool 101 or may be configured to be included in a machine tool. In addition, processing apparatus 201 is configured to perform a determination process and a display process. However, the present disclosure is not limited to this configuration. Processing apparatus 201 may be configured to perform either one of the determination process and the display process.

Processing system 301 according to the embodiment of the present disclosure is configured to include strain sensor 20. However, the present disclosure is not limited to this configuration. Processing system 301 may be configured to include another sensor such as an acceleration sensor instead of strain sensor 20 or in addition to strain sensor 20.

Furthermore, in processing apparatus 201 according to the first embodiment of the present disclosure, rotation rate acquisition unit 131 is configured to receive rotation rate information indicating rotation rate S from accepting unit 120. However, the present disclosure is not limited to this configuration. For example, rotation rate acquisition unit 131 may be configured to acquire a measurement result by an acceleration sensor (not shown) attached to cutting tool 101 to calculate rotation rate S of cutting tool 101 based on the acquired measurement result. Alternatively, rotation rate acquisition unit 131 may be configured to receive rotation rate information from a control unit in a machine tool.

In processing apparatus 201 according to the first embodiment of the present disclosure, accepting unit 120 is configured to generate upper-limit frequency information indicating upper-limit frequency Fmax input into text box Tb1 in display image DS1 before the start of cutting processing to output the generated upper-limit frequency information to frequency acquisition unit 134. However, the present disclosure is not limited to this configuration. For example, the upper-limit frequency information may be stored in storage unit 170 in advance. In this case, accepting unit 120 may be configured not to perform the process of generating the upper-limit frequency information and outputting the upper-limit frequency information to frequency acquisition unit 134 before the start of the cutting processing.

In processing apparatus 201 according to the first embodiment of the present disclosure, processing unit 140 is configured to determine a value obtained by rounding off a sampling frequency calculated based on Expression (1) to the nearest whole number, as sampling frequency F. However, the present disclosure is not limited to this configuration. Processing unit 140 may be configured to determine, as sampling frequency F, a value obtained by performing rounding processing other than rounding off on a digit in any place of an integer part and a decimal part of the sampling frequency calculated based on Expression (1). Average value pb2 of angle pitch p in a case where sampling is performed in accordance with a sampling frequency obtained by the rounding processing is the same as average value pa2 of angle pitch p in a case where the sampling is performed in accordance with a sampling frequency calculated based on Expression (1), regardless of where the rounding processing is performed on a digit in any place of the sampling frequency calculated based on Expression (1). On the other hand, a difference between maximum value pb1 and minimum value pb3 of angle pitch p in the case where sampling is performed in accordance with the sampling frequency obtained by the rounding processing increases as the rounding processing is performed on a digit in a higher place of the sampling frequency calculated based on Expression (1). However, the difference does not vary depending on a place of a digit on which the rounding processing is performed, but converges to a predetermined value as the place of the digit on which the rounding processing is performed becomes higher. The number of significant digits of a settable value as a sampling frequency varies depending on the specification of AD converter 21. For example, processing unit 140 performs the above-described rounding processing so that the sampling frequency becomes a settable value as a sampling frequency according to the specification of AD converter 21 and is closest to the sampling frequency calculated based on Expression (1).

In processing apparatus 201 according to the first embodiment of the present disclosure, processing unit 140 unit is configured to determine a value of integer N that satisfies the above Expressions (1) to (4) to determine sampling frequency F and process period T based on the determined value of N. However, the present disclosure is not limited to this configuration. Processing unit 140 may be configured to determine a value of integer N that satisfies the following Expression (5) instead of the above Expression (2), to determine sampling frequency F and process period T based on the determined value of N.

$$T=(60 \times N \times M)/S \qquad (5)$$

In the Expression (5), M is an integer of 2 or greater. This configuration allows processing unit 140 to determine sampling frequency F and process period T for generating, in a pseudo manner, sensor measurement values sx, sy, and sr for M rounds of strain sensor 20.

Further, in processing apparatus 201 according to the first embodiment of the present disclosure, processing unit 140 is configured to determine sampling frequency F and process period T so as to satisfy N×ps<180. However, the present disclosure is not limited to this configuration. Processing unit 140 may be configured to determine integer N, sampling frequency F, and process period T so as to satisfy N×ps≥180.

In processing apparatus 201 according to the first embodiment of the present disclosure, acquisition unit 130 is configured to include frequency acquisition unit 134. However, the present disclosure is not limited to this configuration. Acquisition unit 130 may be configured not to include frequency acquisition unit 134.

In processing apparatus 201 according to the first embodiment of the present disclosure, processing unit 140 is configured to determine integer N, sampling frequency F, and process period T by using Expressions (1) to (4). However, the present disclosure is not limited to this configuration. For example, processing unit 140 may be configured to determine integer N, sampling frequency F, and process period T by using Expressions (1) and (2) without using Expressions (3) and (4). In this case, processing unit 140 displays the determined sampling frequency F and process period T on display device 211. A user determines whether or not to adopt sampling frequency F and process period T displayed on display device 211 based on, for example, the specification of AD converter 21.

In addition, in processing apparatus 201 according to the first embodiment of the present disclosure, processing unit 140 is configured to determine, as process period T, the smallest value among values selectable as process period T. However, the present disclosure is not limited to this configuration. Processing unit 140 may be configured to determine, as process period T, a value other than the smallest value among values selectable as process period T. For example, processing unit 140 may be configured to determine, as process period T, the largest value among values selectable as process period T. This allows processing unit 140 to determine a lower value as sampling frequency F.

In addition, in processing apparatus 201 according to the first embodiment of the present disclosure, analysis unit 150 is configured to perform a judgment process and an update process at a timing according to process period T. However, the present disclosure is not limited to this configuration. Analysis unit 150 may be configured to perform at least one of the judgment process or the update process at a timing that does not follow process period T. Analysis unit 150 may be configured to perform either one of the judgment process and the update process.

In processing apparatus 201 according to the first embodiment of the present disclosure, analysis unit 150 is configured to interpolate sensor measurement values sx, sy, and sr based on generated two-dimensional data D. However, the present disclosure is not limited to this configuration. Analysis unit 150 may be configured not to interpolate sensor measurement values sx, sy, and sr.

Processing apparatus 201 according to the first embodiment of the present disclosure includes analysis unit 150. However, the present disclosure is not limited to this configuration. Analysis unit 150 may be included in an apparatus other than processing apparatus 201.

In processing apparatus 201 according to the first embodiment of the present disclosure, processing unit 140 performs a process of displaying, on display device 211, sampling frequency F, process period T, two-dimensional coordinates C2A, two-dimensional coordinates C2B, maximum value pc1, average value pc2, and minimum value pc3 that are determined in a determination process. However, the present disclosure is not limited to this configuration. Processing unit 140 may be configured not to display part of the display content on display device 211. For example, processing unit 140 may be configured to display two-dimensional coordinates C2A on display device 211 without displaying determined sampling frequency F and process period T and two-dimensional coordinates C2B on display device 211. In this case, by adjusting a value of set frequency Forg to be input into text box Tb3 while checking a distribution of measuring points MP in two-dimensional coordinates C2A displayed in graph display region G1 and values displayed in regions Rg11 to Rg13, a user can find a suitable set frequency Forg at which a large number of measuring points MP are distributed at angle pitch p equal to upper-limit pitch pmax or less in rotation circle SR in two-dimensional coordinates C2A. When the user finds the suitable set frequency Forg, the user sets the set frequency Forg in AD converter 21 and starts cutting processing.

Next, another embodiment according to the present disclosure will be described with reference to the drawings. Note that the same or corresponding parts in the drawings are denoted by the same reference numerals, and description thereof will not be repeated.

Second Embodiment

Compared with processing system 301 according to the first embodiment, the present embodiment relates to a processing system 302 including a cutting tool 102 which is a turning tool. Processing system 302 is the same as processing system 301 according to the first embodiment except for the contents described below.

[Processing System]

Figure 24:
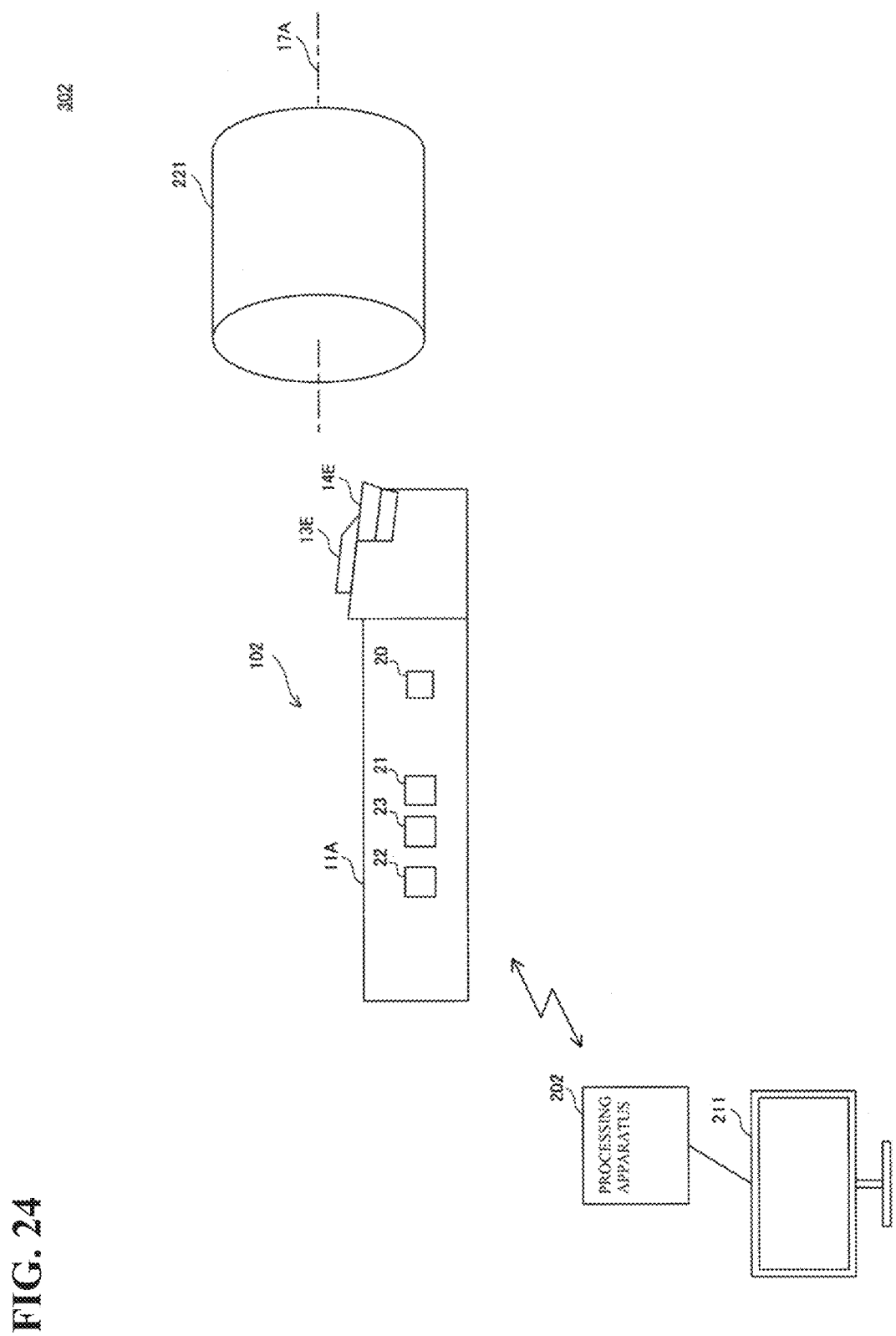
FIG. 24 is a diagram showing a configuration of a processing system according to a second embodiment of the present disclosure.

FIG. 24 is a diagram showing a configuration of a processing system according to a second embodiment of the present disclosure. Referring to FIG. 24, processing system 302 includes cutting tool 102 and a processing apparatus 202 instead of cutting tool 101 and processing apparatus 201, compared with processing system 301 according to the first embodiment. Cutting tool 102 is a turning tool.

[Cutting Tool]

Cutting tool 102 is used for turning a workpiece 221 subjected to cutting which is made of metal or the like, for example. Cutting tool 102 is, for example, an indexable turning tool, that is, a throw-away turning tool. Cutting tool 102 is clamped and fixed from above and below by a tool rest (not shown) in a machine tool such as a lathe. Cutting tool 102 includes a shank portion 11A and a blade fixing portion 13E. Blade fixing portion 13E fixes a chip 14E to a tip end portion of shank portion 11A.

For example, strain sensor 20, AD converter 21, battery 22, and wireless communication device 23 are attached to a peripheral surface of shank portion 11A through an adhesive or a pressure sensitive adhesive. Processing system 302 may be configured to include two or more strain sensors 20.

Workpiece 221 subjected to cutting is mounted to a main shaft (not shown) of the machine tool. The main shaft has a columnar shape and applies a rotational force to workpiece 221 subjected to cutting. Workpiece 221 subjected to cutting is rotated about rotation axis 17A by the rotational force. Workpiece 221 subjected to cutting is an example of a rotor.

[Processing Apparatus]

Figure 25:
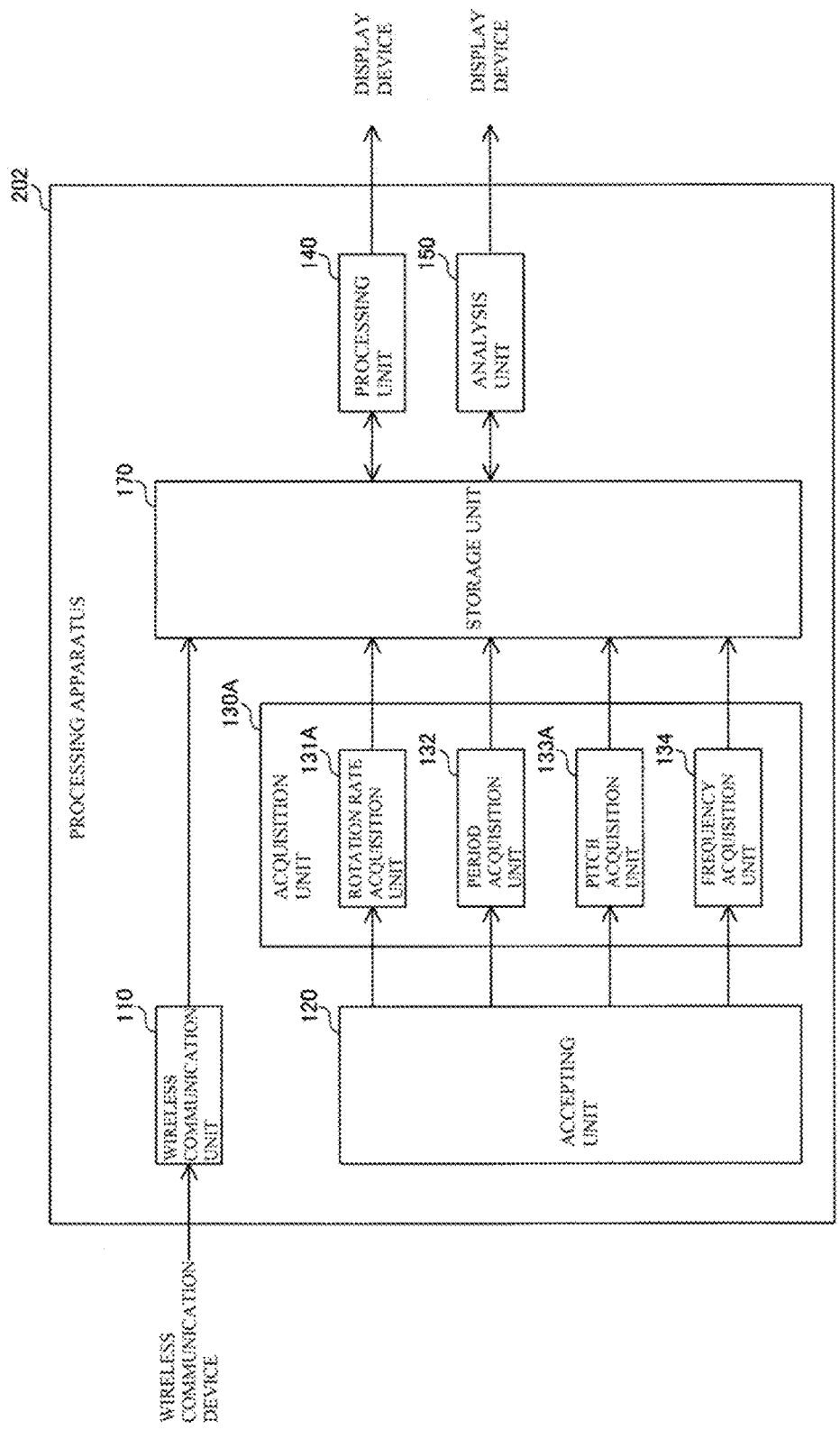
FIG. 25 is a diagram showing a configuration of a processing apparatus in the processing system according to the second embodiment of the present disclosure.

FIG. 25 is a diagram showing a configuration of a processing apparatus in the processing system according to the second embodiment of the present disclosure. Referring to FIG. 25, processing apparatus 202 includes acquisition unit 130A instead of acquisition unit 130, compared with processing apparatus 201 according to the first embodiment. Compared with acquisition unit 130, acquisition unit 130A includes a rotation rate acquisition unit 131A and a pitch acquisition unit 133A instead of rotation rate acquisition unit 131 and pitch acquisition unit 133.

Rotation rate acquisition unit 131A acquires rotation rate S [rpm] of workpiece 221 subjected to cutting, which is a rotor that rotates about a rotation axis 17A. More specifically, rotation rate acquisition unit 131A acquires rotation rate S of workpiece 221 subjected to cutting that is set in the machine tool before the start of cutting processing.

Pitch acquisition unit 133A acquires upper-limit pitch pmax that is an upper-limit value of angle pitch p [degree] that is a rotation angle between two adjacent sampling time points in a coordinate system representing a phase at a time point of sampling performed by AD converter 21 in rotation circle SRA that is a path of a point that rotates about rotation axis 17A as workpiece 221 subjected to cutting rotates, for example, a path of an arbitrary point X on an outer peripheral surface of workpiece 221 subjected to cutting. More specifically, pitch acquisition unit 133 acquires upper-limit pitch pmax that is set by the user before the start of cutting processing.

Processing unit 140 performs a determination process of determining sampling frequency F and process period T in AD converter 21 before the start of cutting processing. Processing unit 140 then performs a display process of displaying the determined sampling frequency F, process period T, and the like on display device 211. The details of the determination process and the display process are as described in the first embodiment.

Processing system 302 allows more efficient generation of sensor measurement values as well as processing system 301 according to the first embodiment.

For example, in a case where workpiece 221 subjected to cutting that has an uneven shape such as a gear member is subjected to cutting processing using cutting tool 102, a time period in which chip 14E is in contact with workpiece 221 subjected to cutting and a time period in which chip 14E is not in contact with workpiece 221 subjected to cutting alternately occur during the cutting processing. In this case, in a conventional processing system, depending on the relationship between rotation rate S of workpiece 221 subjected to cutting and a sampling frequency of AD converter 21, measuring point MPA indicating a position of point X at a time point of sampling in rotation circle SRA may overlap in two-dimensional coordinates C2 having rotation axis 17A as an origin, so that most of sensor measurement values generated by AD converter 21 may be sensor measurement values in the time period in which chip 14E is not in contact with workpiece 221 subjected to cutting.

On the other hand, since processing system 302 can generate, in a pseudo manner, sensor measurement values for one round of strain sensor 20 corresponding to a large number of measuring points MPA in the time period taken by workpiece 221 subjected to cutting to rotate N times, it is possible to more reliably generate sensor measurement values in the time period in which chip 14E is in contact with workpiece 221 subjected to cutting.

It should be understood that the above-described embodiments are illustrative and non-restrictive in all respects. The scope of the present invention is defined by the claims, not by the above description, and is intended to include all modifications within the meaning and scope equivalent to the claims.

The above description includes the following additional features.

[Supplementary Note 1]

A processing system including:
a cutting tool;
a sensor attached to the cutting tool;
an AD converter configured to perform sampling on an analog signal output from the sensor to generate a digital signal; and
a processing unit,
wherein the processing unit is configured to, based on a rotation rate [rpm] of a rotor that rotates about a rotation axis; an upper-limit period that is an upper-limit value of a process period that is a period with which a predetermined process is performed using the digital signal generated by the AD converter; and an upper-limit pitch that is an upper-limit value of an angle pitch [degree] that is a rotation angle between two adjacent sampling time points in a coordinate system representing a phase at a time point of sampling performed by the AD converter in a rotation circle that is a path of a point that rotates about the rotation axis as the rotor rotates, determine the process period and a sampling frequency with which the AD converter performs sampling such that a set value of the angle pitch is equal to the upper-limit pitch or less in a time period taken by the rotor to rotate N times with the process period that is equal to the upper-limit period or shorter,
wherein N and (360/ps) are integers of 2 or greater and are relatively prime, where ps denotes the set value, and
wherein the processing unit is configured to perform a process of displaying information that allows recognition of a distribution state of a phase at a time point of sampling in a case where the AD converter performs sampling in accordance with the sampling frequency in the time period taken by the rotor to rotate N times and a distribution state of a phase at a time point of sampling in a case where the AD converter performs sampling in accordance with the set frequency with the upper-limit period.

REFERENCE SIGNS LIST 10 shaft portion
11, 11A shank portion
12 blade attaching portion
13, 13E blade fixing portion
14, 14E chip
17, 17A rotation axis
18 cutting force exertion plane
20 strain sensor
21 AD converter
22 battery
23 wireless communication device
24 housing
101, 102 cutting tool
110 wireless communication unit
120 accepting unit
130, 130A acquisition unit
131, 131A rotation rate acquisition unit
132 period acquisition unit
133, 133A pitch acquisition unit
134 frequency acquisition unit
140 processing unit
150 analysis unit
170 storage unit
201, 202 processing apparatus
210 tool holder
211 display device
220 main shaft
221 workpiece subjected to cutting
301, 302 processing system

The invention claimed is:

1. A processing system comprising:
a cutting tool;
a sensor attached to the cutting tool;
an AD (analog-to-digital) converter configured to perform sampling on an analog signal output from the sensor to generate a digital signal; and
a processor, the processor being configured to determine a process period and a sampling frequency with which the AD converter performs sampling, based on (1) a rotation rate [rpm] of a rotor that rotates about a rotation axis, (2) an upper-limit period that is an upper-limit value of the process period, and (3) an upper-limit pitch that is an upper-limit value of an angle pitch [degree], the process period being a period with which a predetermined process is performed using the digital signal generated by the AD converter, the angle pitch being a rotation angle between two adjacent sampling time points in a coordinate system representing a phase at a time point of sampling performed by the AD converter in a rotation circle that is a path of a point that rotates about the rotation axis as the rotor rotates, wherein the processor is configured to determine the process period and the sampling frequency with which the AD converter performs sampling such that a set value of the angle pitch is equal to the upper-limit pitch or less in a time period taken by the rotor to rotate N times with the process period that is equal to the upper-limit period or shorter, wherein N and (360/ps) are integers of 2 or greater and are relatively prime, where ps denotes the set value, and wherein the processor being configured to determine the sampling frequency and the process period such that N×ps<180 is satisfied.

2. The processing system according to claim 1, wherein the processor is configured to acquire an upper-limit frequency that is an upper-limit value in the AD converter, and determine the sampling frequency that is equal to the acquired upper-limit frequency or lower.

3. The processing system according to claim 2, wherein the processor is configured to determine a value of N that satisfies Expressions (1) to (4), and determine the sampling frequency and the process period, based on the determined value of N, the Expressions (1) to (4) being $$F=(6 \times S)/(N \times ps) \quad (1),$$

$$T=(60 \times N)/S \quad (2),$$

$$T \leq T\max \quad (3), \text{ and}$$

$$F \leq F\max \quad (4),$$

where S denotes the rotation rate, F denotes the sampling frequency, Fmax denotes the upper-limit frequency, T denotes the process period, and Tmax denotes the upper-limit period.

4. The processing system according to claim 1, wherein the processor is configured to determine, as the process period, a smallest value among values selectable as the process period.

5. The processing system according to claim 1, wherein the processor is configured to perform, as the predetermined process, a judgment process related to an abnormality in cutting processing in which the cutting tool is used by using the digital signal generated by the AD converter at a timing according to the process period determined by the processor.

6. The processing system according to claim 1, wherein the processor is configured to perform a process of generating two-dimensional data at each sampling time, based on the digital signal generated by the AD converter, the two-dimensional data relating to loads which the cutting tool receives in two directions, and perform, as the predetermined process, an update process of updating the two-dimensional data at a timing according to the process period determined by the processor.

7. The processing system according to claim 6, the processor is configured to interpolate the digital signal, based on the generated two-dimensional data.

8. The processing system according to claim 1, wherein the rotor is the cutting tool, and the cutting tool is a milling tool.

9. The processing system according to claim 1, wherein the rotor is a workpiece subjected to cutting, and the cutting tool is a turning tool.

10. A processing apparatus comprising:

a processor configured to acquire a rotation rate [rpm] of a rotor that rotates about a rotation axis, acquire an upper-limit period that is an upper-limit value of a process period that is a period with which a predetermined process is performed using a digital signal generated by an AD converter, the AD converter being configured to perform sampling on an analog signal output from a sensor attached to a cutting tool, acquire an upper-limit pitch that is an upper-limit value of an angle pitch [degree] that is a rotation angle between two adjacent sampling time points in a coordinate system representing a phase at a time point of sampling performed by the AD converter in a rotation circle that is a path of a point that rotates about the rotation axis as the rotor rotates, based on the rotation rate, the upper-limit period, and the upper-limit pitch, determine the process period and a sampling frequency with which the AD converter performs sampling such that a set value of the angle pitch is equal to the upper-limit pitch or less in a time period taken by the rotor to rotate N times with the process period that is equal to the upper-limit period or shorter, and control the AD converter based on the process period and the sampling frequency, wherein N and (360/ps) are integers of 2 or greater and are relatively prime, where ps denotes the set value, and determine the sampling frequency and the process period such that N×ps<180 is satisfied.

11. A processing method in a processing apparatus, comprising:

acquiring a rotation rate [rpm] of a rotor that rotates about a rotation axis;

acquiring an upper-limit period that is an upper-limit value of a process period that is a period with which a predetermined process is performed using a digital signal generated by an AD converter, the AD converter being configured to perform sampling on an analog signal output from a sensor attached to a cutting tool;

acquiring an upper-limit pitch that is an upper-limit value of an angle pitch [degree] that is a rotation angle between two adjacent sampling time points in a coordinate system representing a phase at a time point of sampling performed by the AD converter in a rotation circle that is a path of a point that rotates about the rotation axis as the rotor rotates;

based on the acquired rotation rate, the acquired upper-limit period, and the acquired upper-limit pitch, determining the process period and a sampling frequency with which the AD converter performs sampling such that a set value of the angle pitch is equal to the upper-limit pitch or less in a time period taken by the rotor to rotate N times with the process period that is equal to the upper-limit period or shorter, and control the AD converter based on the process period and the sampling frequency, wherein N and (360/ps) are integers of 2 or greater and are relatively prime, where ps denotes the set value, and determining the process period and the sampling frequency such that N×ps<180 is satisfied.

12. A non-transitory computer readable medium including executable instructions, which when executed by a computer cause the computer to:

acquire a rotation rate [rpm] of a rotor that rotates about a rotation axis, acquire an upper-limit period that is an upper-limit value of a process period that is a period with which a predetermined process is performed using a digital signal generated by an AD converter, the AD converter being configured to perform sampling on an analog signal output from a sensor attached to a cutting tool, acquire an upper-limit pitch that is an upper-limit value of an angle pitch [degree] that is a rotation angle between two adjacent sampling time points in a coordinate system representing a phase at a time point of sampling performed by the AD converter in a rotation circle that is a path of a point that rotates about the rotation axis as the rotor rotates, based on the rotation rate, the upper-limit period, and the upper-limit pitch, determine the process period and a sampling frequency with which the AD converter performs sampling such that a set value of the angle pitch is equal to the upper-limit pitch or less in a time period taken by the rotor to rotate N times with the process period that is equal to the upper-limit period or shorter, and control the AD converter based on the process period and the sampling frequency, wherein N and (360/ps) are integers of 2 or greater and are relatively prime, where ps denotes the set value, and determine the sampling frequency and the process period such that N×ps<180 is satisfied.

13. A display system comprising:

a cutting tool;

a sensor attached to the cutting tool;

an AD converter configured to perform sampling on an analog signal output from the sensor to generate a digital signal; and a processing apparatus, the processing apparatus being configured to, based on a rotation rate [rpm] of a rotor that rotates about a rotation axis, an upper-limit period that is an upper-limit value of a process period, and an upper-limit pitch that is an upper-limit value of an angle pitch [degree], the process period being a period with which a predetermined process is performed using the digital signal generated by the AD converter, the angle pitch being a rotation angle between two adjacent sampling time points in a coordinate system representing a phase at a time point of sampling performed by the AD converter in a rotation circle that is a path of a point that rotates about the rotation axis as the rotor rotates, perform a process of displaying the process period and a sampling frequency with which the AD converter performs sampling such that a set value of the angle pitch is equal to the upper-limit pitch or less in a time period taken by the rotor to rotate N times with the process period that is equal to the upper-limit period or shorter, wherein N and (360/ps) are integers of 2 or greater and are relatively prime, where ps denotes the set value, and wherein the processing apparatus being configured to perform a process of displaying at least one of an average value or a maximum value of rotation angles each between two adjacent sampling time points in the coordinate system in a case where the AD converter performs sampling in accordance with the sampling frequency obtained by rounding processing with the upper-limit period.

14. The display system according to claim 13, wherein the processing apparatus is configured to perform a process of displaying information that allows recognition of a distribution state of a phase at a time point of sampling in a case where the AD converter performs sampling in accordance with the sampling frequency in the time period taken by the rotor to rotate N times.

15. A display system comprising:

a cutting tool;

a sensor attached to the cutting tool;

an AD converter configured to perform sampling on an analog signal output from the sensor to generate a digital signal; and a processing apparatus, the processing apparatus being configured to, based on a rotation rate [rpm] of the rotor that rotates about a rotation axis, an upper-limit period that is an upper-limit value of a process period that is a period with which a predetermined process is performed using the digital signal generated by the AD converter, and a set frequency that is a sampling frequency set by a user, perform a process of displaying information that allows recognition of a distribution state of a phase indicating rotation angle of a rotor at a time point of sampling in a case where the AD converter performs sampling in accordance with the set frequency with the upper-limit period, and wherein the processing apparatus being configured to perform a process of displaying at least one of an average value or a maximum value of rotation angles each between two adjacent sampling time points in a coordinate system representing the phase at a time point of sampling performed by the AD converter in a rotation circle that is a path of a point that rotates about the rotation axis as the rotor rotates, in a case where the AD converter performs sampling in accordance with a set frequency with the upper-limit period, the set frequency being a sampling frequency set by a user.

16. The display system according to claim 15, wherein the processing apparatus is configured to based on the rotation rate, the upper-limit period, and an upper-limit pitch that is an upper-limit value of an angle pitch [degree] that is a rotation angle between two adjacent sampling time points in a coordinate system representing a phase at a time point of sampling performed by the AD converter in a rotation circle that is a path of a point that rotates about the rotation axis as the rotor rotates, perform the process of displaying the information that allows recognition of the distribution state of the phase at the time point of sampling in a case where the AD converter performs sampling in accordance with the sampling frequency with which the AD converter performs sampling such that a set value of the angle pitch is equal to the upper-limit pitch or less in a time period taken by the rotor to rotate N times with the process period that is equal to the upper-limit period or shorter, wherein N and (360/ps) are integers of 2 or greater and are relatively prime, where ps denotes the set value.

17. A processing apparatus comprising:
a processor configured to
acquire a rotation rate [rpm] of a rotor that rotates about a rotation axis,
acquire an upper-limit period that is an upper-limit value of a process period that is a period with which a predetermined process is performed using a digital signal generated by an AD converter, the AD converter being configured to perform sampling on an analog signal output from a sensor attached to a cutting tool,
acquire an upper-limit pitch that is an upper-limit value of an angle pitch [degree] that is a rotation angle between two adjacent sampling time points in a coordinate system representing a phase at a time point of sampling performed by the AD converter in a rotation circle that is a path of a point that rotates about the rotation axis as the rotor rotates,
based on the rotation rate, the upper-limit period, and the upper-limit pitch, perform a process of displaying the process period and a sampling frequency with which the AD converter performs sampling such that a set value of the angle pitch is equal to the upper-limit pitch or less in a time period taken by the rotor to rotate N times with the process period that is equal to the upper-limit period or shorter, wherein N and (360/ps) are integers of 2 or greater and are relatively prime, where ps denotes the set value,
perform a process of displaying at least one of an average value or a maximum value of rotation angles each between two adjacent sampling time points in the coordinate system in a case where the AD converter performs sampling in accordance with the sampling frequency obtained by rounding processing with the upper-limit period, and
control the AD converter based on the process period and the sampling frequency.

18. A processing apparatus comprising:
a processor configured to
acquire a rotation rate [rpm] of a rotor that rotates about a rotation axis,
acquire an upper-limit period that is an upper-limit value of a process period that is a period with which a predetermined process is performed using a digital signal generated by an AD converter, the AD converter being configured to perform sampling on an analog signal output from a sensor attached to a cutting tool,
acquire a set frequency that is a sampling frequency set by a user, and
based on the rotation rate, the upper-limit period, and the set frequency, perform a process of displaying information that allows recognition of a distribution state of a phase indicating rotation angle of a rotor at a time point of sampling in a case where the AD converter performs sampling in accordance with the set frequency with the upper-limit period, and
perform a process of displaying at least one of an average value or a maximum value of rotation angles each between two adjacent sampling time points in a coordinate system representing the phase at a time point of sampling performed by the AD converter in a rotation circle that is a path of a point that rotates about the rotation axis as the rotor rotates, in a case where the AD converter performs sampling in accordance with a set frequency with the upper-limit period, the set frequency being a sampling frequency set by a user.

19. A processing method in a processing apparatus, comprising:
acquiring a rotation rate [rpm] of a rotor that rotates about a rotation axis;
acquiring an upper-limit period that is an upper-limit value of a process period that is a period with which a predetermined process is performed using a digital signal generated by an AD converter, the AD converter being configured to perform sampling on an analog signal output from a sensor attached to a cutting tool;
acquiring an upper-limit pitch that is an upper-limit value of an angle pitch [degree] that is a rotation angle between two adjacent sampling time points in a coordinate system representing a phase at a time point of sampling performed by the AD converter in a rotation circle that is a path of a point that rotates about the rotation axis as the rotor rotates; and
based on the acquired rotation rate, the acquired upper-limit period, and the acquired upper-limit pitch, performing a process of displaying the process period and a sampling frequency with which the AD converter performs sampling such that a set value of the angle pitch is equal to the upper-limit pitch or less in a time period taken by the rotor to rotate N times with the process period that is equal to the upper-limit period or shorter, wherein
N and (360/ps) are integers of 2 or greater and are relatively prime, where ps denotes the set value, and
in the process of displaying the process period, performing a process of displaying at least one of an average value or a maximum value of rotation angles each between two adjacent sampling time points in the coordinate system in a case where the AD converter performs sampling in accordance with the sampling frequency obtained by rounding processing with the upper-limit period.

20. A processing method in a processing apparatus, comprising:
acquiring a rotation rate [rpm] of a rotor that rotates about a rotation axis;
acquiring an upper-limit period that is an upper-limit value of a process period that is a period with which a predetermined process is performed using a digital signal generated by an AD converter, the AD converter being configured to perform sampling on an analog signal output from a sensor attached to a cutting tool;
acquiring a set frequency that is a sampling frequency set by a user; and
based on the acquired rotation rate, the acquired upper-limit period, and the acquired set frequency, performing a process of displaying information that allows recognition of a distribution state of a phase indicating rotation angle of a rotor at a time point of sampling in a case where the AD converter performs sampling in accordance with the set frequency with the upper-limit period, and
in performing the process of displaying information that allows recognition of the distribution state, performing a process of displaying at least one of an average value or a maximum value of rotation angles each between two adjacent sampling time points in a coordinate system representing the phase at a time point of sampling performed by the AD converter in a rotation circle that is a path of a point that rotates about the rotation axis as the rotor rotates, in a case where the AD converter performs sampling in accordance with a set frequency with the upper-limit period, the set frequency being a sampling frequency set by a user.

21. A non-transitory computer readable medium including executable instructions, which when executed by a computer cause the computer to:
  acquire a rotation rate [rpm] of a rotor that rotates about a rotation axis,
  acquire an upper-limit period that is an upper-limit value of a process period that is a period with which a predetermined process is performed using a digital signal generated by an AD converter, the AD converter being configured to perform sampling on an analog signal output from a sensor attached to a cutting tool,
  acquire an upper-limit pitch that is an upper-limit value of an angle pitch [degree] that is a rotation angle between two adjacent sampling time points in a coordinate system representing a phase at a time point of sampling performed by the AD converter in a rotation circle that is a path of a point that rotates about the rotation axis as the rotor rotates, and
  based on the rotation rate, the upper-limit period, and the upper-limit pitch, perform a process of displaying the process period and a sampling frequency with which the AD converter performs sampling such that a set value of the angle pitch is equal to the upper-limit pitch or less in a time period taken by the rotor to rotate N times with the process period that is equal to the upper-limit period or shorter, wherein
  N and (360/ps) are integers of 2 or greater and are relatively prime, where ps denotes the set value, and
  perform a process of displaying at least one of an average value or a maximum value of rotation angles each between two adjacent sampling time points in the coordinate system in a case where the AD converter performs sampling in accordance with the sampling frequency obtained by rounding processing with the upper-limit period.

22. A non-transitory computer readable medium including executable instructions, which when executed by a computer cause the computer to:
  acquire a rotation rate [rpm] of a rotor that rotates about a rotation axis,
  acquire an upper-limit period that is an upper-limit value of a process period that is a period with which a predetermined process is performed using a digital signal generated by an AD converter, the AD converter being configured to perform sampling on an analog signal output from a sensor attached to a cutting tool,
  acquire a set frequency that is a sampling frequency set by a user
  based on the rotation rate, the upper-limit period, and the set frequency, perform a process of displaying information that allows recognition of a distribution state of a phase indicating rotation angle of a rotor at a time point of sampling in a case where the AD converter performs sampling in accordance with the set frequency with the upper-limit period, and
  perform a process of displaying at least one of an average value or a maximum value of rotation angles each between two adjacent sampling time points in a coordinate system representing the phase at a time point of sampling performed by the AD converter in a rotation circle that is a path of a point that rotates about the rotation axis as the rotor rotates, in a case where the AD converter performs sampling in accordance with a set frequency with the upper-limit period, the set frequency being a sampling frequency set by a user.

* * * * *